US010505798B2

(12) United States Patent
Zhang et al.

(10) Patent No.: US 10,505,798 B2
(45) Date of Patent: *Dec. 10, 2019

(54) SYSTEMS AND METHODS FOR PROVIDING CUSTOMIZED VIRTUAL WIRELESS NETWORKS BASED ON SERVICE ORIENTED NETWORK AUTO-CREATION

(71) Applicant: Huawei Technologies Co., Ltd., Shenzhen (CN)

(72) Inventors: Hang Zhang, Nepean (CA); Xu Li, Nepean (CA); Nimal Gamini Senarath, Ottawa (CA); Sophie Vrzic, Kanata (CA); Ngoc-Dung Dao, Ottawa (CA); Hamidreza Farmanbar, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/033,677

(22) Filed: Jul. 12, 2018

(65) Prior Publication Data

US 2018/0337823 A1 Nov. 22, 2018

Related U.S. Application Data

(63) Continuation of application No. 14/952,995, filed on Nov. 26, 2015, now Pat. No. 10,084,643.
(Continued)

(51) Int. Cl.
G06F 15/177 (2006.01)
H04L 12/24 (2006.01)
(Continued)

(52) U.S. Cl.
CPC .......... H04L 41/0806 (2013.01); H04L 41/00 (2013.01); H04L 41/12 (2013.01);
(Continued)

(58) Field of Classification Search
CPC . H04L 41/0806; H04L 41/12; H04L 41/5041; H04L 45/02; H04W 4/005; H04W 40/248
(Continued)

(56) References Cited

U.S. PATENT DOCUMENTS 8,843,600 B1 9/2014 Gabrielson et al.
2006/0248330 A1 11/2006 Randle et al.
(Continued)

FOREIGN PATENT DOCUMENTS

CN 101179559 A 5/2008
CN 104104718 A 10/2014
(Continued)

OTHER PUBLICATIONS

Callegati, F. et al., "Performance of Multi-tenant Virtual Networks in OpenStack-based Cloud Infrastructures," IEEE Globecomm Workshops (GC Wkshps), Dec. 2014, 5 pages.
(Continued)

Primary Examiner — Hee Soo Kim
(74) Attorney, Agent, or Firm — Slater Matsil, LLP

(57) ABSTRACT

System and method embodiments are provided for providing customized virtual networks based on SONAC. In an embodiment, a network management entity for providing a customized VN includes a SONAC module executed by a computing device that is connected to a wireless network, the SONAC module configured to receive service requirement data from the wireless network and create a service customized VN according to the service requirement data, the service requirement data describing one or more service requirements, wherein the SONAC module comprises an interface to interact with: an SDT component, the SDT component used by the SONAC module to determine a service customized logical topology; an SDRA component that maps the logical topology to physical network resources
(Continued)

within the wireless network; and a SDP component that determines an end-to-end data transport protocol for communication between a first device and a second device via the wireless network.

21 Claims, 27 Drawing Sheets

Related U.S. Application Data

(60) Provisional application No. 62/146,865, filed on Apr. 13, 2015, provisional application No. 62/132,320, filed on Mar. 12, 2015, provisional application No. 62/085,405, filed on Nov. 28, 2014.

(51) Int. Cl.
    *H04W 4/70*         (2018.01)
    *H04L 12/751*      (2013.01)
    *H04W 40/24*       (2009.01)
    *H04W 40/32*       (2009.01)

(52) U.S. Cl.
    CPC .......... *H04L 41/5041* (2013.01); *H04L 45/02* (2013.01); *H04W 4/70* (2018.02); *H04W 40/248* (2013.01); *H04W 40/32* (2013.01)

(58) Field of Classification Search
    USPC .......................................................... 709/220
    See application file for complete search history.

(56) References Cited

U.S. PATENT DOCUMENTS

| | | | |
|---|---|---|---|
| 2008/0114863 A1 | 5/2008 | Baskey et al. | |
| 2008/0310424 A1 | 12/2008 | Peterson et al. | |
| 2011/0004457 A1* | 1/2011 | Haviv | G06F 8/61 703/21 |
| 2011/0125905 A1 | 5/2011 | Baucke et al. | |
| 2013/0343309 A1 | 12/2013 | Mehta | |
| 2014/0153572 A1* | 6/2014 | Hampel | H04L 12/6418 370/392 |
| 2014/0307556 A1 | 10/2014 | Zhang | |
| 2014/0310388 A1 | 10/2014 | Djukic et al. | |
| 2015/0257012 A1 | 9/2015 | Zhang | |

FOREIGN PATENT DOCUMENTS

| | | |
|---|---|---|
| JP | 2011508474 A | 3/2011 |
| JP | 2012049712 A | 3/2012 |
| WO | 2015134751 A1 | 9/2015 |

OTHER PUBLICATIONS

Etsi, Network Functions Virtualisation, downloaded from http://www.etsi.org/technologies-clusters/technologies/nfv on Apr. 11, 2016, 2 pages.

Han, B. et al., "Network Functions Virtualization: Challenges and Opportunities for Innovations," IEEE Communications Magazine, Feb. 2015, 8 pages, vol. 53, Issue 2.

Hawilo, H. et al., "NFV: State of the Art, Challenges and Implementation in Next Generation Mobile Networks (vEPC)," IEEE Network Magazine, Nov. 2014, 11 pages.

Hu, F. et al., "A Survey on Software-Defined Network and OpenFlow: From Concept to Implementation," IEEE Communication Survey & Tutorials, 2014, 28 pages, vol. 16, No. 4, Fourth Quarter.

Jacobson, V. et al., "Networking Named Content," ACM Digital Library, CoNEXT, Dec. 2009, 12 pages, Rome, Italy.

Jain, R. et al., "Network Virtualization and Software Defined Networking for Cloud Computing: A Survey," Cloud Networking and Communications, IEEE Communications Magazine, Nov. 2013, 8 pages.

Kerpez, K. et al., "Software-Defined Access Networks," Accepted From Open Call, IEEE Communications Magazine, Sep. 2014, 8 pages.

Liang, J. et al., "SDViNet: A Software Defined Virtual Network Management Platform in IaaS Cloud," 2014 IEEE, 2014, 6 pages.

McKeown, N. et al., "OpenFlow: Enabling Innovation in Campus Networks," http://archive.openflow.org/documents/openflow-wplatest.pdf, Mar. 14, 2008, downloaded Nov. 26, 2015, 6 pages.

"Mobile and Wireless Communications Enablers for the Twenty-twenty Information Society (METIS)," Final Report on Architecture, Document Number: ICT-317669-METIS/D6.4, METIS, Jan. 2015, 189 pages.

"Network Functions Virtualisation, an Introduction, Benefits, Enablers, Challenges & Call for Action," Network Functions Virtualisation—Introductory White Paper, Oct. 2012, 16 pages, Issue 1.

"Network Functions Virtualisation (NFV); Architectural Framework," ETSI GS NFV 002 Group Specification, Oct. 2013, 21 pages, V1.1.1.

"Network Functions Virtualisation (NFV); Management and Orchestration," ESTI GS NFV-MAN 001, Dec. 2014, 184 pages, V1.1.1.

"Network Functions Virtualisation (NFV), Network Operator Perspectives on Industry Progress," Network Functions Virtualisation—White Paper #3, Oct. 2014, 20 pages, Issue 1.

"Network Functions Virtualisation (NFV), Network Operator Perspectives on Industry Progress," Network Functions Virtualisation—Updated White Paper, Oct. 2013, 16 pages, Issue 1.

"Network Functions Virtualisation (NFV); Use Cases," ETSI GS NFV 001, Group Specification, Oct. 2013, 50 pages, V1.1.1.

"Network Functions Virtualisation (NFV); Virtualisation Requirements," ETSI GS NFV 004, Group Specification, Oct. 2013, 17 pages, V1.1.1.

NGMN Alliance, "5G White Paper—Executive Version," NGMN White Paper, Dec. 22, 2014, 20 pages, Version 1.0.

ONF, Open Networking Foundation, Technical Library, downloaded from https://www.opennetworking.org/sdn-resources/technical-library, Apr. 11, 2016, 3 pages.

OpenFlow-enabled SDN and Network Functions Virtualization, Open Networking Foundation, ONF Solution Brief, Feb. 17, 2014, 12 pages.

Osseiran, A. et al., "Scenarios for the 5G Mobile and Wireless Communications: the Vision of the METIS Project," IEEE Communications Magazine, 2014, 20 pages, vol. 52, No. 5.

Pentikousis, K. et al., "MobileFlow: Toward Software-Defined Mobile Networks," Future Carrier Networks, IEEE Communications Magazine, Jul. 2013, 10 pages.

Rubio-Loyola, J. et al., "Scalable Service Deployment on Software-Defined Networks," Topics in Network and Service Management, IEEE Communication Magazine, Dec. 2011, 10 pages.

Sezer, S. et al., "Are We Ready for SDN? Implementation Challenges for Software-Defined Networks," IEEE Communications Magazine, Jul. 12, 2013, 13 pages, vol. 51 Issue 7.

Soares, J. et al., "Toward a Telco Cloud Environment for Service Functions," Network and Service Virtualization, IEEE Communications Magazine, Feb. 2015, 9 pages, vol. 53, No. 2.

"Software-Defined Networking: The New Norm for Networks," Open Networking Foundation, ONF White Paper, Apr. 13, 2012, 12 pages.

* cited by examiner

SYSTEMS AND METHODS FOR PROVIDING CUSTOMIZED VIRTUAL WIRELESS NETWORKS BASED ON SERVICE ORIENTED NETWORK AUTO-CREATION

This application is a continuation of U.S. application Ser. No. 14/952,995, filed on Nov. 26, 2015, titled "Systems and Methods for Providing Customized Virtual Wireless Networks Based on Service Oriented Network Auto-creation," which claims the benefit of U.S. Provisional Application No. 62/146,865, filed on Apr. 13, 2015, titled "System and Method for an Interface Reference Model," U.S. Provisional Application No. 62/132,320, filed on Mar. 12, 2015, titled "System and Method for an Interface Reference Model," and U.S. Provisional Application No. 62/085,405, filed on Nov. 28, 2014, titled "System and Method of Providing Customized Virtual Wireless Networks Based on Service Oriented Network Auto-Creation," whose applications are hereby incorporated by reference.

TECHNICAL FIELD

The present invention relates to a system and method for network architecture, and, in particular embodiments, to a system and method for an interface reference model and to customizable, service-oriented wireless networks.

BACKGROUND

Fifth Generation (5G) wireless networks may represent a major paradigm shift from previous wireless networks. For example, 5G wireless networks may utilize high carrier frequencies with larger numbers of antennas than is conventionally deployed in existing 3G/4G networks. Moreover, 5G wireless networks may be highly integrative, allowing transitions between supported 5G air interfaces to existing network interfaces such as LTE and WiFi to provide high-rate coverage with a seamless user experience. 5G wireless networks may also include densely deployed heterogeneous radio access networks (RANs) having macro base stations and low power microcell, picocell, and femtocell nodes that may be inter-connected via wireless access mesh backhaul networks.

SUMMARY

In accordance with an embodiment of the present invention, a network management entity for providing a customized virtual wireless network includes a service-oriented virtual network auto-creation (SONAC) module executed by a computing device that is connected to a wireless network, the SONAC module configured to receive service requirement data from the wireless network and create a service customized virtual network (VN) according to the service requirement data, the service requirement data describing one or more service requirements; wherein the SONAC module comprises an interface to interact with: a software-defined topology (SDI) component, the SDT component used by the SONAC module to determine a service customized logical topology; a software-defined resource allocation (SDRA) component that maps the logical topology to physical network resources within the wireless network; and a software-defined protocol (SDP) component that determines an end-to-end data transport protocol for communication between a first device and a second device via the wireless network.

In accordance with an embodiment of the present invention, a method in a network device for providing a customized virtual wireless network includes receiving, by a service-oriented virtual network auto-creation (SONAC) module executed by a computing device that is connected to a wireless network, service requirement data representing one or more service requirements; and creating a service customized virtual network (VN) according to the service requirement data, wherein creating the service customized VN comprises determining a service-customized logical topology, mapping the determined logical topology to physical network resources, and determining an end-to-end data transport protocol for use by entities in the logical topology in accordance with the availability of the physical network resources.

In accordance with an embodiment of the present invention, a network node includes a processor; and a non-transitory computer readable storage medium storing programming for execution by the processor, the programming including instructions to: receive, a service-oriented virtual network auto-creation (SONAC) module, service requirement data representing one or more service requirements; and create a service customized virtual network (VN) according to the service requirement data, wherein the instructions to create the service customized VN comprises instructions to: determine a service-customized logical topology, map the determined logical topology to physical network resources, and determine an end-to-end data transport protocol for use by entities in the logical topology in accordance with the availability of the physical network resources.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

Figure 1:
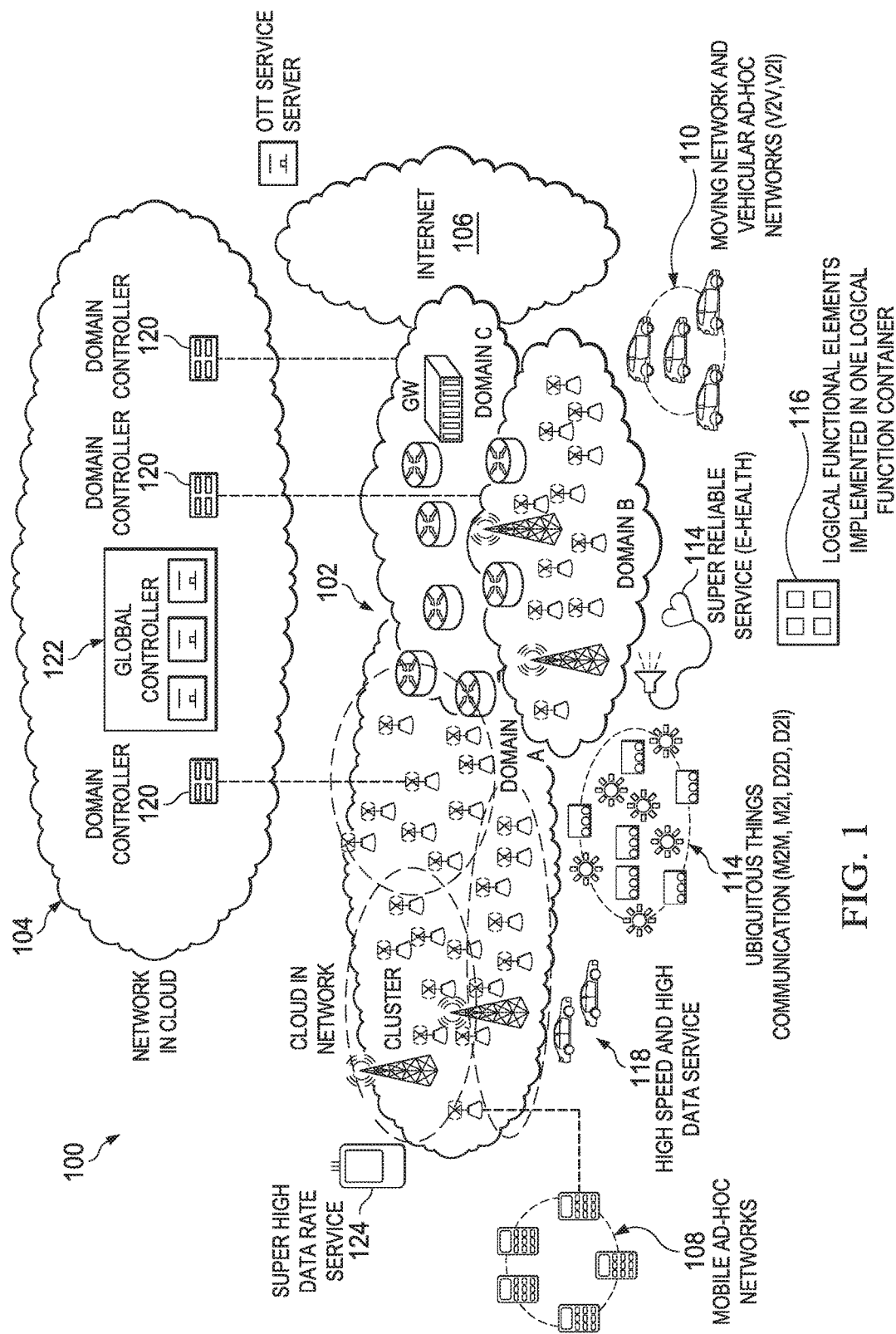
FIG. 1 is a block diagram of an embodiment of a wireless communication network.

The structure, manufacture and use of embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

U.S. patent application Ser. No. 14/639,572, entitled "System and Method for a Customized Fifth Generation (5G) Network," filed Mar. 5, 2015, which is hereby incorporated herein by reference, discloses a logical function architecture for next-generation 5G wireless networks. The logical function architecture includes a data plane, a control plane, and a management plane.

Disclosed herein is a service-centric and logical function oriented network architecture for future 5G wireless networks (WNs), referred to as MyNET, and a key enabling technique, a Software Defined Network Application Control (SONAC) entity. With MyNET architecture and SONAC, connectivity and networking services can be provided by service-customized virtual networks (SCVNs). Customers can also actively define, manage, and even operate their own virtual networks without reliance on network provider technicians. Various embodiments of this disclosure may also result in a transformation of the network architecture, operation, and management.

Aspects of this disclosure provide an Intra-Network VN (Slice) entity. A SONAC layer may be configured for a specific physical network and/or a specific virtual network (slice). In a service customized virtual network (such as a virtual network of a virtual operator), the virtual network resource can be further divided into multiple virtual networks with each of them being customized for its customer. This may be provided by an intra-a virtual network SONAC.

Aspects of this disclosure provide a service VN customized CSM. The service VN customized CSM may include a vertical and horizontal customer service management (CSM) entity. The CSM entity may be service oriented, instead of device oriented, and may be cooperative based. The CSM may be customized for a service associated with a virtual network. The CSM may provide network access protection for a JOINT multi-partner scheme that includes 3rd parties, service customers, devices of customers, and wireless network operators. The CSM may enable the decoupling of a service customer and a particular wireless network operator. The CSM may provide charging functionality at an anchor point of a service, e.g., v-s-SGWs, M2M services, etc. The CSM may also provide cloud resource and bandwidth based charging, service based QoE, assurance, and service based and collaborative context maintenance among operators.

Aspects of this disclosure further provide a logical hierarchical architecture and topology. The logical hierarchical architecture and topology may include a global CSM/3rd party for monitoring service registered context and on-line statistics of services/charging info/key materials. The logical hierarchical architecture and topology may also include a domain CMS or operator CSM to acquire customer information from a global/ 3rd party CSM, and to provide updates (on-line statistics/charging) to global/3rd party CSM. The logical hierarchical architecture and topology may include a CSM at all layers, which may create a virtual customer service CSM (v-s-CSM) to perform the related functions for a particular service. The v-s-CSM can be created, migrated, and terminated on-demand. The logical hierarchical architecture and topology may also include CMS service interfaces with SONAC for v-s-CSM for CSM service VN updates.

Aspects of this disclosure further provide a service VN customized connectivity management (CM) entity. The service VN customized CM entity may have a hierarchical structure. A service VN customized CM may be present at all layers to perform functions for a particular service. The functions can be service customized for different services or service types (e.g., Internet of Thing, M2M, mobile broadband services, etc.). The service VN customized CM entity may provide customized device/machine/mobile location tracking for different services and/or service types. The service VN customized CM entity may also provide customized devices/machine/mobility MAC (operation) state management. Aspects of this disclosure further provide a control plane-user plane (C-U) interface within a user plane (or data plane) to interact with SONAC and to trigger its corresponding VN updates.

In order to enable service customized networks, existing 3G/4G control and management functions are extended, new control and management functions are identified, and a new logical architecture is proposed. This allows use of the current 3G/4G architecture while allowing seamless migration to new network equipment and devices.

In an embodiment, a hardware-software manager (HSM) local control layer within an network functions virtualization (NFV)-enabled network node (NN) includes a virtual infrastructure manager (VIM) and a virtual network function manager (VNFM) configured for controlling local cloud resources for instantiating virtualized network functions (VNFs) as instructed by software defined topology (SDT) and software defined process (SDP); a data process manager (DPM) configured for controlling processing of data based on a process chain definition by instruction the by SDP; and a data forwarding manager (DFM) configured for controlling data forwarding based on a forwarding rule by software defined resource allocation (SDRA).

In an embodiment, a method for interacting with a network functions virtualization (NFV)-enabled network node (NN) or an NFV-enabled datacenter (DC) includes determining, by software defined network application control (SONAC), virtualized network functions (VNFs) to be created. Non-transport functions can be determined by software defined topology (SDT) and transport functions can be determined by software defined process (SDP). Determining a data process chain within the NN or DC for one service can be done by SDP. Determining a forwarding rule for virtual network data can be done by software defined resource allocation (SDRA).

In an embodiment, a logical network includes a general wireless network infrastructure and a network management plane communicatively coupled to the general wireless network infrastructure via an I-M interface, wherein the network management plane is adapted to send infrastructure configuration instructions over the interface to the general wireless network infrastructure, and to receive infrastructure behavior log messages over the I-M interface from the general wireless network infrastructure.

In an embodiment, a logical network includes a software defined network application control (SONAC) control plane and a management plane coupled to the SONAC control plane via an M-API interface, wherein the management plane functions on the management plane are adapted to communicate specific requirements via the M-API interface to the SONAC control plane, the specific requirements include one or a combination of a requirement description, a latency requirement, a capacity requirement, and required logical functions. In an embodiment, the SONAC control plane includes at least one intra-network virtual network (VN) slice associated with a sub-portion of a virtual network resource. In. an embodiment, the logical network also includes a customer service management (CSM) entity that is service oriented, the CSM entity configured to provide network access protection, charging, service based QoE assurance, service based and collaborative context maintenance among operators, or combinations thereof. In an embodiment, the logical network also includes a connectivity management (CM) entity that is adapted to be customized for different services or service types.

In an embodiment, a system for providing a customized virtual wireless network includes a service-oriented virtual network auto-creation (SONAC) entity instantiated upon a computing platform that is connected to a wireless network for receiving service requirement data describing one or more service requirements, wherein the SONAC module includes a software-defined topology (SDT) component to determine a service-customized logical topology; a software-defined resource allocation (SDRA) component that maps the logical topology to physical network resources; and a software-defined protocol (SDP) component that determines an end-to-end data transport protocol. In an embodiment, the SDT component communicates with a NFV management component to request creation of the logical functions. In an embodiment, the SONAC module is configured to instantiate or to terminate a virtual and service-specific gateways such as a SGW, in response to service requirement data for an M2M service. In an embodiment, the SONAC module is configured to associate a virtual UE-specific SGW in response to service requirement data for a registered UE. In an embodiment, the SONAC module is configured to create a virtual user connectivity manager for a UE in response to service requirement data for the UE.

In an embodiment, a method of providing a customized virtual wireless network includes receiving service requirement data representing one or more service requirements by a service-oriented virtual network auto-creation (SONAC) entity instantiated upon a computing platform that is connected to a wireless network; determining a service-customized logical topology using a software-defined topology (SDT) component of the SONAC module; mapping the logical topology to physical network resources using a software-defined resource allocation (SDRA) component of the SONAC module; and determining an end-to-end data transport protocol using a software-defined protocol (SDP). In an embodiment, determining the service-customized logical topology includes communicating with a NM, management component to request creation of the logical functions. In an embodiment, the method includes instantiating or terminating a virtual and service-specific SGW in response to receiving service requirement data for an M2M service. In an embodiment, the method includes associating a virtual UE-specific SGW in response to receiving service requirement data for a registered UE. In an embodiment, the method includes creating a virtual user connectivity manager for a UE in response to receiving service requirement data for the UE.

In an embodiment, a non-transitory computer-readable medium includes code which when stored in a memory and executed by a processor of a computing device causes the computing device to provide a customized virtual wireless network by: receiving service requirement data representing one or more service requirements by a service-oriented virtual network auto-creation (SONAC) module executed by a computing device that is connected to a wireless network; determining a service-customized logical topology using a software-defined topology (SDT) component of the SONAC module; mapping the logical topology to physical network resources using a software-defined resource allocation (SDRA) component of the SONAC module; and determining an end-to-end data transport protocol using a software-defined protocol (SDP). In an embodiment, the code for determining the service-customized logical topology includes code that causes the device to communicate with a NFV management component to request creation of the logical functions. In an embodiment, the non-transitory computer-readable medium includes code that causes the device to instantiate or terminate a virtual and service-specific SGW in response to receiving service requirement data for an M2M service. In an embodiment, the computer-readable medium includes code that causes the device to associate a virtual UE-specific SGW in response to receiving service requirement data for a registered UE. In an embodiment, the computer-readable medium includes code that causes the device to create a virtual user connectivity manager for a UE in response to receiving service requirement data for the UE.

The wireless telecommunication industry is facing increasing demands on network capacity to support a large number of devices requiring always-on connectivity and applications demanding stringent requirements such as low latency and high peak data rates. In addition, services of future wireless networks (WNs) have significant diversity in service requirements and service characteristics. There is also an emerging trend demanding openness in the wireless telecommunication industry in order to utilize third party resources and services by establishing appropriate partnerships.

From the perspective of network resources, future 5G WN models should intelligently integrate a variety of network resources from multiple resource owners, including mobile network and wired network infrastructures, spectral resources, and data centers, in order to maximize resource utilization and meet traffic load requirements. From the perspective of services delivered by networks, future WNs should provide service-customized virtual networks (SCVNs) to satisfy the diverse traffic demands and requirements. From the perspective of network operation, full automation of network service provisioning and network control/management is required to enable rapid service provisioning and flexible network operation. In addition, future WNs will feature a completely open market and extensive cooperation among partners. We can anticipate more types of players being introduced to this industry due to the openness of the market. One type of player is the infrastructure provider, which includes telecommunication network infrastructure (network nodes (NNs), physical connection links, etc.) providers, spectrum providers, and data center (DC) providers. Another type of player is the physical network operator such as wireless network operators (WNOs), which control and manage the WNs. More WNOs can be envisioned in the future due to this openness.

A third type of player is a virtual network operator (VNO), which provides networking services for its customers using the services obtained from other network operators that may or may not provide the physical infrastructure. Then, there are over-the-top (OTT) customers and end customers. The former are application service providers, which provide application services to their subscribers using wireless network resources; the latter are the end customers that send or receive data traffic using the wireless network resources.

Disclosed herein is a wireless network architecture. Assuming the availability of network programmability provided by network functions virtualization (NFV) and software defined networking (SDN), a 5G wireless network architecture, MyNET, is disclosed. The disclosed architecture facilitates the provisioning of SCVNs and redefines wireless network control/management functionality.

IT applications in wireless networks may be implemented based on the following paradigms: (1) Cloud in network. Cloud computing technology in IT industry is being applied in the telecommunication industry by introducing the virtual machine concept into network node design. Future wireless networks, thus, have the nature of "cloud in network"; (2) Network in cloud. Separation of the control plane and the data plane leads to increased computational complexity in the control plane, which, in some cases, can be implemented in data centers. This can be viewed as "network in cloud"; and (3) Confederation of Wireless Networks. In the future, multiple wireless networks, including both large and small wireless networks, co-located or disjointed networks, are expected to contribute to a unified wireless network which provides consistent customer experiences world-wide. This requires cooperation of wireless network operators at a much deeper level than as found in current 3G/4G networks.

NFV (Network Function Virtualization) and non-NFV capable network nodes may co-exist. In future wireless networks, to provide sufficient flexibility to enable customized networks and flexible control/management architectures, selected network nodes should be designed as NFV-capable nodes. NFV-capable network nodes can be viewed as containers of functional elements which can be configured on an on-demand basis.

The wireless network may implement a hierarchical network control and management architecture.

In MyNET, basic logical functions are identified for both the control and data planes. These basic functions include both existing network functions, with some of them being enhanced or extended, as well as new network functions. In an embodiment, one of the key techniques of MyNET, service-oriented virtual network auto-creation (SONAC), selects and deploys a subset of these functions to provide customized network services. SCVN provisioning is fully automated, encompassing the instantiation, adaptation, migration, and termination of SCVNs. SONAC and all management functions/services are endowed with a degree of topological hierarchy to enable collaborations between operators, distribute computational complexity, and reduce control signaling latency by pushing SONAC and other management function elements to the network edge.

Vision of 5G Wireless Networks

In an embodiment, wireless network resources can be integrated into general networks as a variety of network resources from multiple resource owners, including wireless and wired infrastructures, spectral resources and data centers in order to maximize resource utilization arid meet the need for increased traffic load. From the perspective of services delivered by networks, wireless networks may be able to provide service customized (virtual) networks to satisfy the disparate traffic demands and requirements. In an embodiment, from the perspective of network operation, Service Oriented virtual Network Auto-Creation (SONAC) may be used to enable multiple virtual networks to serve multiple coexisting services to efficiently share a common network resource pool. From the perspective of the wireless network market, the wireless network market should be open to as many users as possible.

It has also been discovered that a wide variety of customer services co-exist and that wireless networks should be able to support a wide variety of services. These services present huge disparate traffic demands and requirements in a service level topology, traffic characteristics, experience requirements, data process requirements, service lifecycles, etc.

It has further been discovered that multiple radio access network deployment scenarios co-exist. The coexistence of multiple deployment scenarios can be predicted in future wireless networks to fit the different traffic load expectation in different geographic areas. Densely deployed and ultra-densely deployed scenarios can become important deployment scenarios.

FIG. 1 is a block diagram of an embodiment of a wireless communication network 100. Network 100 includes a cloud in network 102, a network in cloud 104, and the Internet 106. The cloud in network 102 is divided into several domains labeled domain A, domain B, and domain C. The cloud in network may include various transmit points (TPs), routers, and other devices configured to communicate with each other. The wireless communication network 100 also includes mobile ad-hoc networks 108 and moving network and vehicular ad-hoc networks 110. Various services may also be provided by the network 100. Logical functional elements may be implemented in one or more logical function containers 116 that may be centrally located or distributed throughout the network 100. These services include super high data rate service 124, high speed and high data service 118, and super reliable service (e-health) 112. The network 100 may also facilitate "ubiquitous things"

communication (e.g., machine-to-machine (M2M), machine-to-internet (M2I), device-to-device (D2D), and device-to-internet (D2I)). In an embodiment, domain C may be connected to the Internet 106 via a gateway (GW) and Over-the-top (OTT) services may be provided by a OTT service server. The network in cloud may include a plurality of domain controllers 120 each controlling a respective one of the domains (domain A, domain B, domain C) in cloud in network 102. The network in cloud may also include a global controller 122. In an embodiment, 5G may be characterized by the following attributes.

Coexistence of a wide variety of customer services: In an embodiment, wireless networks should be able to support a wide variety of services. These services may present immensely diverse traffic demands and requirements in service-level topology, traffic characteristics, experience requirements, data processing requirements, service life cycles, and so on.

Coexistence of multiple radio access network deployment scenarios: In an embodiment, coexistence of multiple deployment scenarios can be modeled in wireless networks to fit the different traffic load expectations in different geographic areas. Densely deployed and ultra-densely deployed scenarios can become important deployment scenarios.

IT technology in Wireless Networks:
   Cloud in network: Cloud computing technology in the information technology (IT) industry is being applied to the telecommunication industry by introducing the virtual machine concept into network node design. In an embodiment, wireless networks thus have the nature of "cloud in network."
   Network in cloud: Separation of the control plane and the data plane leads to increased computational complexity. Computation demanding algorithms, in some embodiments, can be implemented in data centers. This can be viewed as "network in cloud."
   General wireless network infrastructure: In an embodiment, the generalized wireless network infrastructure (GWNI) resource pool integrates telecommunication network resources including NFV-capable network nodes (access nodes, wireless backhaul nodes, switches), and NFV-capable data center resources. These NFV-enabled network entities (NEs) can be viewed as containers to hold logical function elements.
   Confederation of wireless networks: In an embodiment, multiple wireless networks, including both large and small wireless networks, co-located or disjointed, are expected to contribute to a unified wireless network that provides consistent customer experiences worldwide. In an embodiment, this may require much deeper cooperation among wireless network operators than that found in 3G/4G.
   Hierarchical network control/management architecture: In an embodiment, to make network control and management scalable, a network is divided into domains, regions, areas, and so on. In this regard, the topology of network control and management thus becomes hierarchical, as shown in FIG. 1. In an embodiment, the confederation of wireless networks requires a hierarchical architecture as well. Part of the GWNI within a domain is abstracted to global control/management function elements. The function elements at the global level have a global view on end-to-end service requirements and are able to coordinate the operation of function elements one layer lower. Similar assumptions are valid between the domain and regional layers and so on. The function elements at the global level could be run by a third party to coordinate the operations of multiple WNOs.

Logical function-oriented design principle: A logical function-oriented design means that the basic logical functions are identified and placed in the network based on demands. This principle is applicable to the user and control/management planes. As shown in FIG. 1, multiple logical control/management functions can be defined and distributed among multiple containers of functional elements.

Industrial Activities in 5G Research

In an embodiment, one of the key benefits of NFV is the elasticity provided by the infrastructure for capacity expansion and the rollout of new network functions. In 2012, the Network Function Virtualization Industry Specification Group (NFV ISG), under the auspices of the European Telecommunications Standards Institute (ETSI), was launched. NFV ISG defines and develops NFV management and orchestration (MANO) to provide the high-level automation needed for the provisioning, configuration, and performance testing of virtualized network functions. Management and orchestration of virtualized resources encompass all functions required to provide virtual network functions (VNFs) and network services with the resources they need in order to execute properly. MANO utilizes virtualized infrastructure managers (VIMS) and virtual network function managers (VNFMs) to monitor, instantiate, update, and terminate VNF elements.

SDN is a new architecture that has been designed to enable more agile and cost-effective networks. The Open Networking Foundation (ONF) is taking the lead in SDN standardization, and has defined an SDN architecture model. The ONF/SDN architecture consists of three distinct layers that are accessible through open application programming interfaces (APIs). The application layer consists of the end-user business applications that consume the SDN communications services. The control layer provides the logically centralized control functionality that supervises the network forwarding behavior through an open interface. The infrastructure layer consists of the network elements and devices that provide packet switching and forwarding.

The Next Generation Mobile Networks (NGMN) Alliance is an open forum founded by world-leading mobile network operators. NGMN envisions an architecture that leverages the structural separation of hardware and software, as well as the programmability offered by SDN and NFV. The architecture proposed by NGMN comprises three layers, and an end-to-end (E2E) MANO function. An infrastructure resource layer contains the physical resources of a fixed-mobile converged network, comprising access nodes, cloud nodes, 5G devices, networking nodes, and associated links. A business application layer includes specific applications and services of the operator, enterprise, verticals, and third parties that utilize the 5G network. A library of all functions is required within a converged network in the form of modular architecture building blocks, constituting a business enablement layer. The E2E MANO plays a central role in this three-layer architecture, and has the capability to manage such a virtualized network E2E. It defines the network slices for a given application scenario, chains the relevant modular network functions, assigns the relevant performance configurations, and finally maps all of this onto the infrastructure resources.

Mission of Future 5G Wireless Networks

The mission of future 5G WNs is to create multidimensional connections, interlinking people, things, and information content. In an embodiment, 5G WNs should be able to optimally support different types of customers, each potentially with specific service-related requirements.

Figure 2:
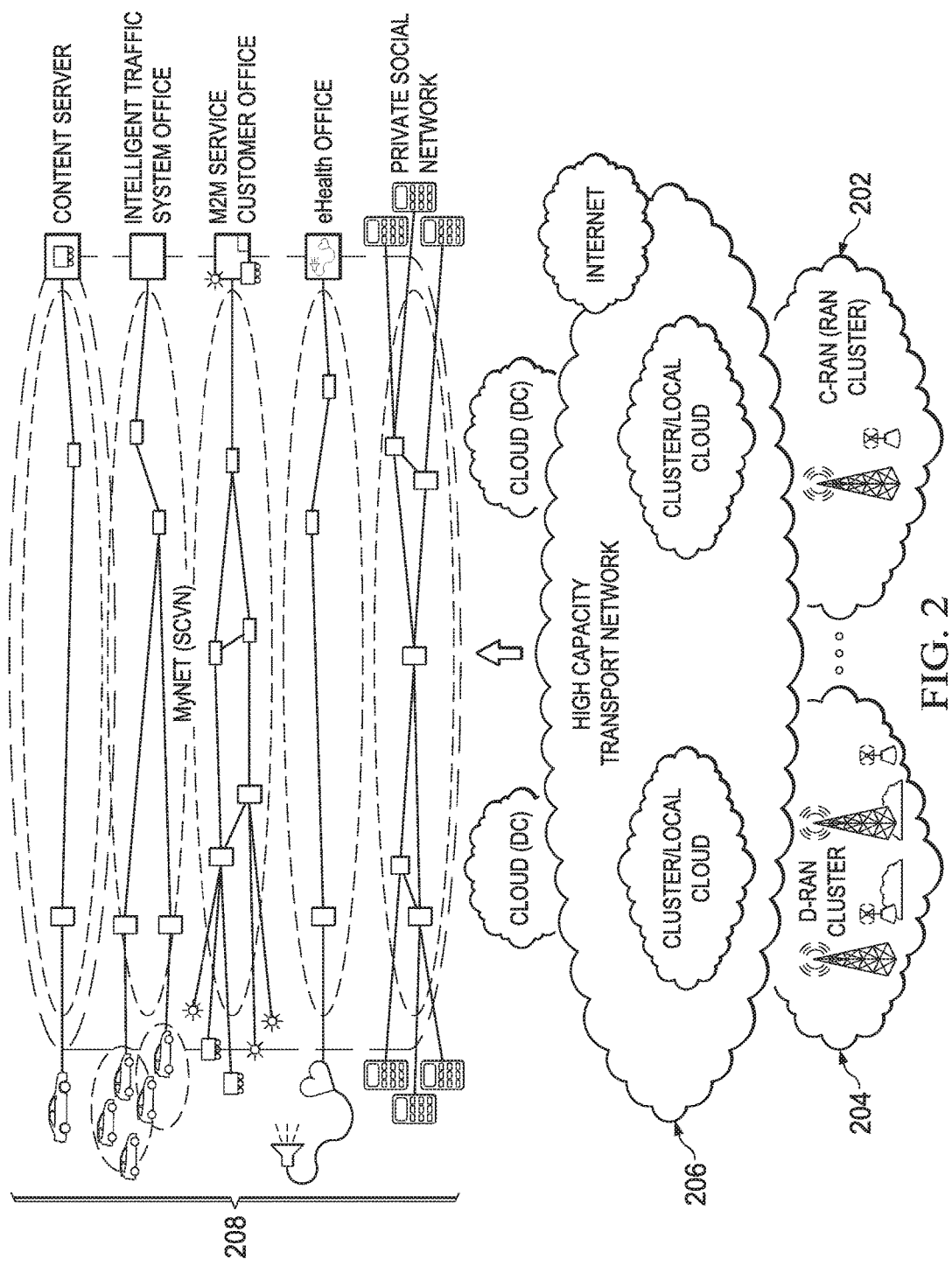
FIG. 2 is a block diagram of an embodiment of a GWNI.

The diversity and variability in service requirements preclude one-size-fits-all solutions and require flexible design to provide service-customized solutions. In an embodiment, a service-oriented 5G model is designed to address one or more of the following:

Ensure that customer service-level expectations are met
Provide specialized handling of traffic flows to and from the wireless devices
Make it permissible for customers to configure specialized traffic processes In an embodiment, this diversity of needs will be met in a 5G wireless network by specifying different SCVNs, all of them sharing wireless resources from a common resource pool (see FIG. 2). A network that is capable of provisioning these SCVNs is referred to as MyNET since they are customized for individual or industry services in order to best fit the service model and requirements.

FIG. 2 is a block diagram of an embodiment of a GWNI 200. As shown in FIG. 2, the GWNI 200 includes cloud radio access networks (C-RANs) 202 and distributed radio access networks (DRANs) clusters 204 along with high-capacity transport networks 206 linking these clusters. The GWNI 200 also includes cloud resources associated with DCs and NFV-enabled network nodes. On top of this, the service-specific functional elements 208 of each virtual network can be implemented in selected NFV enabled NEs. This is to tailor the network operations in accordance to service requirements and consequently satisfy the quality of experience (QoE) requirements of the service. An SCVN/slice can be created for one type of services, for example, massive machine-to-machine (M2M) services, critical M2M services, and mobile broadband (MBB) services. In an SCVN, one or multiple virtual service-specific serving gateway (v-s-SGW) could be introduced. Some of these v-s-SGWs logically associate with edge NNs and are defined as edge v-s-SGWs. An SCVN can also be created for an individual user where a v-u-SGW is defined. An individual user's VN can be created directly from GWNI or from an MBB slice. These v-s-SGWs and v-u-SGWs are the main components of an SCVN. These edge v-s-SGWs and v-u-SGWs divide an SCVN into virtual access and core segments.

The functions implemented in a v-s-SGW/v-u-SGW may include, but are not limited to, functions defined by operators: a GW linking a device/mobile to an SCVN, mobility anchor point functions, data aggregation, protocol translation, and access link specification convergence; functions defined by customers include application-specific processing. A v-s-SGW can be placed at the edges of WNs or in a DC, but it must be service-specific since different services require different user plane functions.

A more important role of the v-s-SGW/v-u-SGW is to make the wireless network support immensely disparate services but still facilitate simple network design and operation due to capability of convergence and translation.

MyNET: A Redefined Network Architecture

A number of factors impact the design principles of the 5G WN architecture. The flexible and rapid provisioning of services requires full automation techniques. The openness of the market needs much more extensive and deeper collaboration among WNOs than that found in 3G/4G. The Internet of Things (IoT)/M2M-type vertical services need service-centric rather than device/mobile-centric architecture design. In addition, a content-friendly design must be provided by future network architecture.

Figure 3:
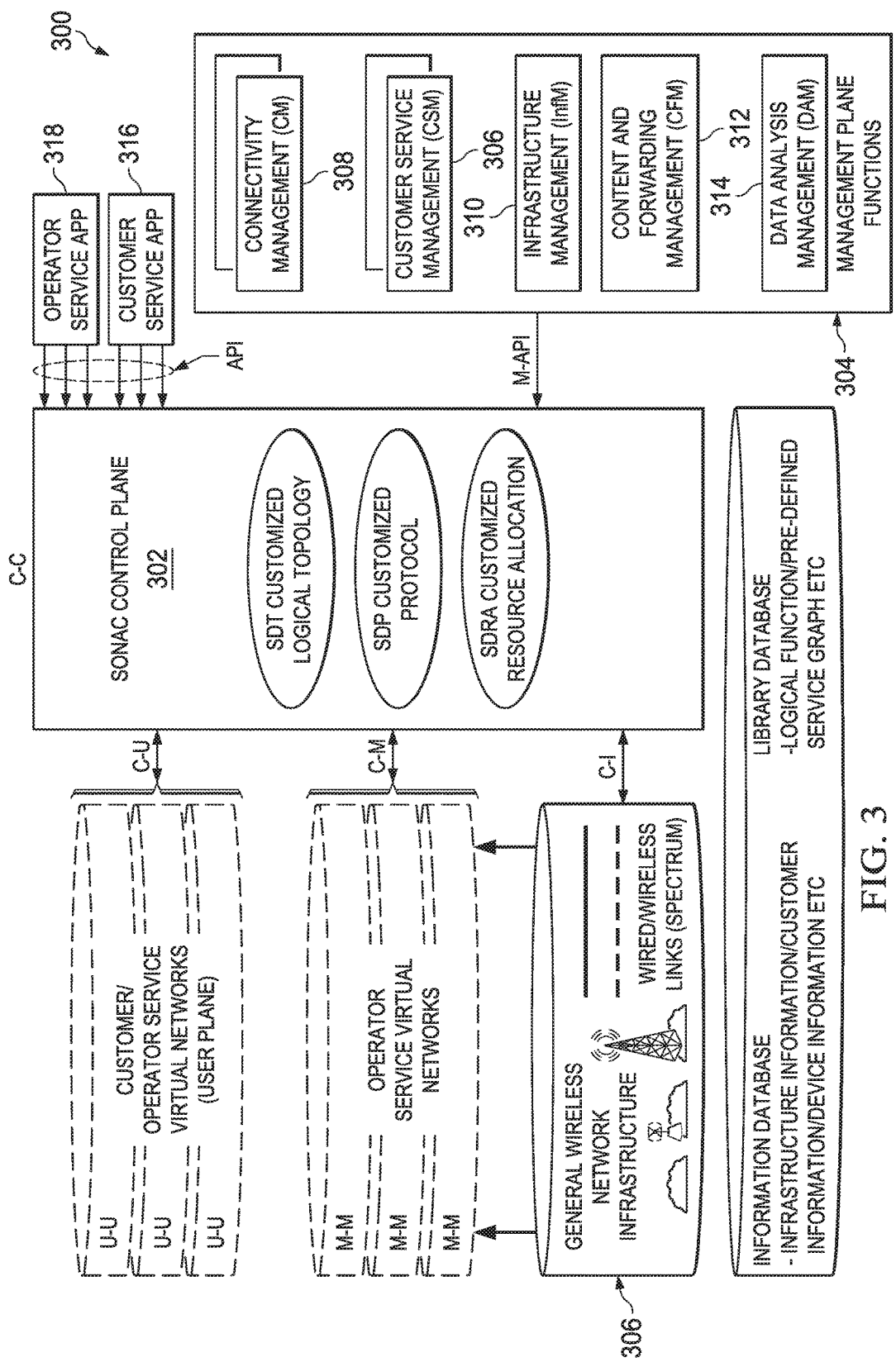
FIG. 3 is a diagram of an embodiment of MyNET architecture.
Figure 4:
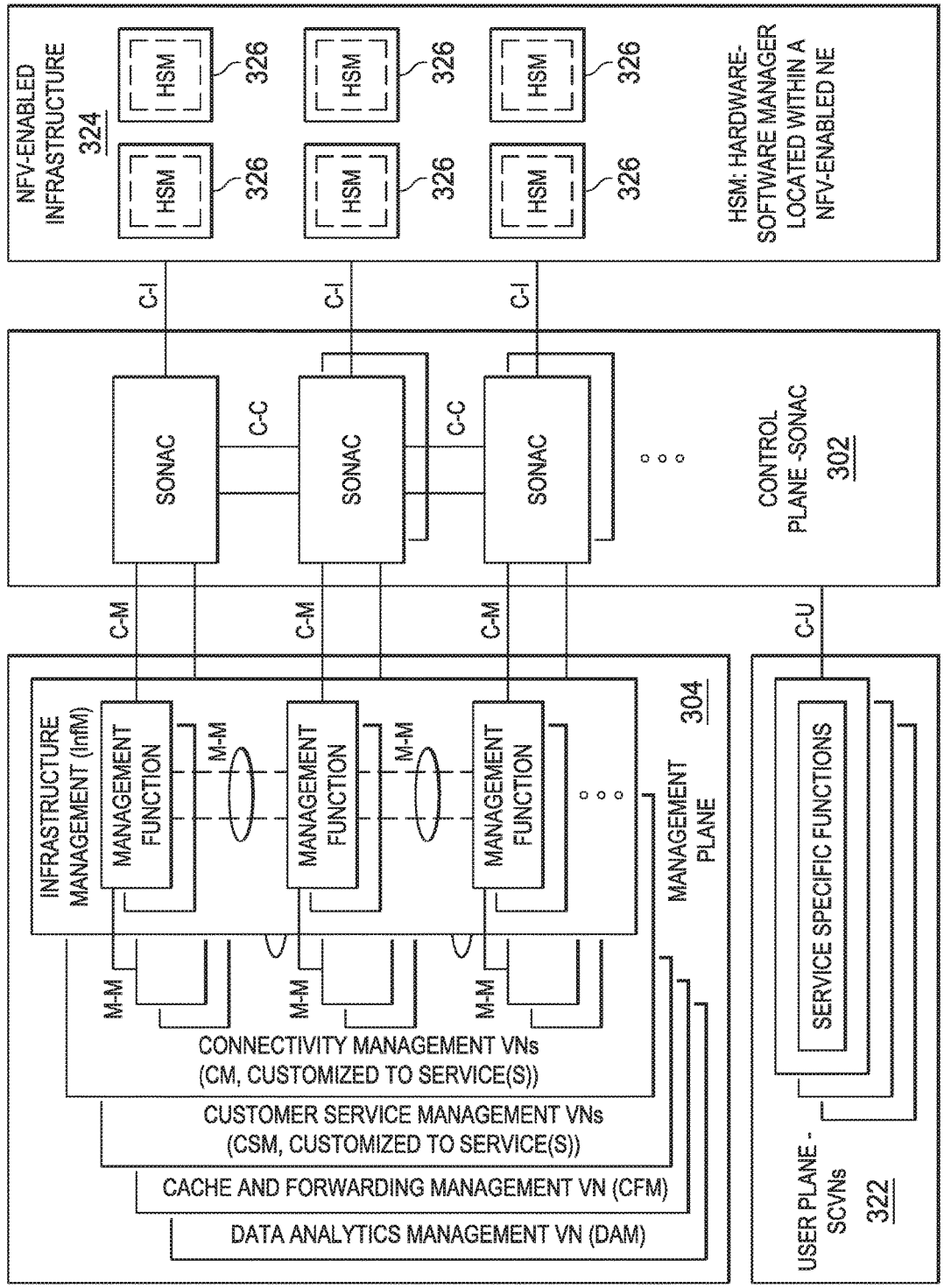
FIG. 4 is a diagram of an embodiment of a hierarchical architecture of SONAC and the interface reference model.

FIG. 3 is a diagram of an embodiment of MyNET architecture 300. FIG. 4 is a diagram of an embodiment of a hierarchical architecture 400 of SONAC and the interface reference model. Based on these considerations, the future WN architecture must be redesigned to address these new challenges. The identified key control/management functions and logical architecture of MyNET are highlighted in FIGS. 3-4.

In FIG. 3, only key interfaces are shown, and a single centralized SONAC is assumed, although the logical architecture and topology of SONAC itself may be hierarchical, as shown in FIGS. 1 and 4. This assumption enables us to focus on the description of key functions and interfaces among them.

Referring to FIGS. 3 and 4, in MyNET architecture 300, basic logical functions are identified for both the control and data planes. These basic functions include existing network functions, with some of them enhanced or extended, as well as new network functions. In this architecture SONAC 302 is introduced and is categorized as a control plane function, which is dedicated to the provisioning of SCVNs. All other network operation related functions are categorized as management plane functions 304. The functional elements related to authentication, authorization, charging, and QoE assurance of services are categorized as customer service management (CSM) functions 306. The functional elements related to device/mobile reachability are categorized as connectivity management (CM) functions 308. CSM 306 and CM 308 and part of SONAC 302 are the extensions of existing MME/policy control and charging rule function (PCRF) function to enable efficient support of new types of services, and should be customized for different services. Functional elements related to the management of resource pool size of GWNI are categorized as infrastructure management (InfM) functions 310, which manages active network topology, including configuration and integration of both cloud resources and network resources. InfM 310 can be viewed as the extension of existing self-organizing network (SON) function. New functions, cache and forwarding management (CFM) 312 and data analytics management (DAM) 314, are introduced to enable the integration of the Internet and mobile networks by CFM 312 and on-demand real-time information extraction by DAM 314. The purpose of this categorization is to enable a systematic design and different topologies of different management services.

In the MyNET architecture, SONAC 302 interfaces with customer services/operator services 316, 318 and management function services 304 via API and M-API interfaces for obtaining service descriptions and requirements. Furthermore, it interfaces with GWNI 320 via control plane-infrastructure plane (C-I) interface to instruct the embedding of VNs into GWNI 320. Interface among user plane functions 322 is denoted as U-U interface. It needs to be emphasized that management function services themselves require virtual network resources. The logical topologies of these VNs are hierarchical and can be automatically updated via a control plane-management plane (C-M) interface. The communication among management services are facilitated through the management plane-management plane (M-M) interface. The customer service VN can be automatically updated by, for example, a v-s-SGW in the user plane, via the C-U interface. For the hierarchical logical topology of SONAC 302, information is exchanged among different layers of the hierarchy and among the three components of SONAC via a control plane-control plane (C-C) interface. In FIG. 4, the interface reference model of SONAC 302 and management function services are shown assuming the hierarchical architecture of SONAC 302. A hardware and software manager (HSM) 326 is associated with and located within a single NFV-enabled NE.

Comparison with NGMN

Both MyNET and NGMN are SDN/NIN native architectures. MyNET defines GWNI, which is similar to the infrastructure layer defined by NGMN. MyNET enables SCVNs, which is similar to slices defined by NGMN; however, MyNET introduces the novel v-s-SGWs concept, which is a key component of SCVN. MyNET also defines the hierarchically structured SONAC. Furthermore, MyNET defines a new set of management functions and a new logical architecture as well as interface reference model. In the following, we elaborate on SONAC techniques and MyNET's management functions, respectively.

Service-Oriented Virtual Network Auto-Creation

In an embodiment, one of the main tasks of SONAC is to provide SCVNs. The resource pool that SONAC can use is the resource pool in GWNI. For the purpose of SONAC operation, each NFV-enabled entity, including network nodes, servers, and DCs, is abstracted as a single NFV-enabled NE.

SONAC Techniques

Figure 5:
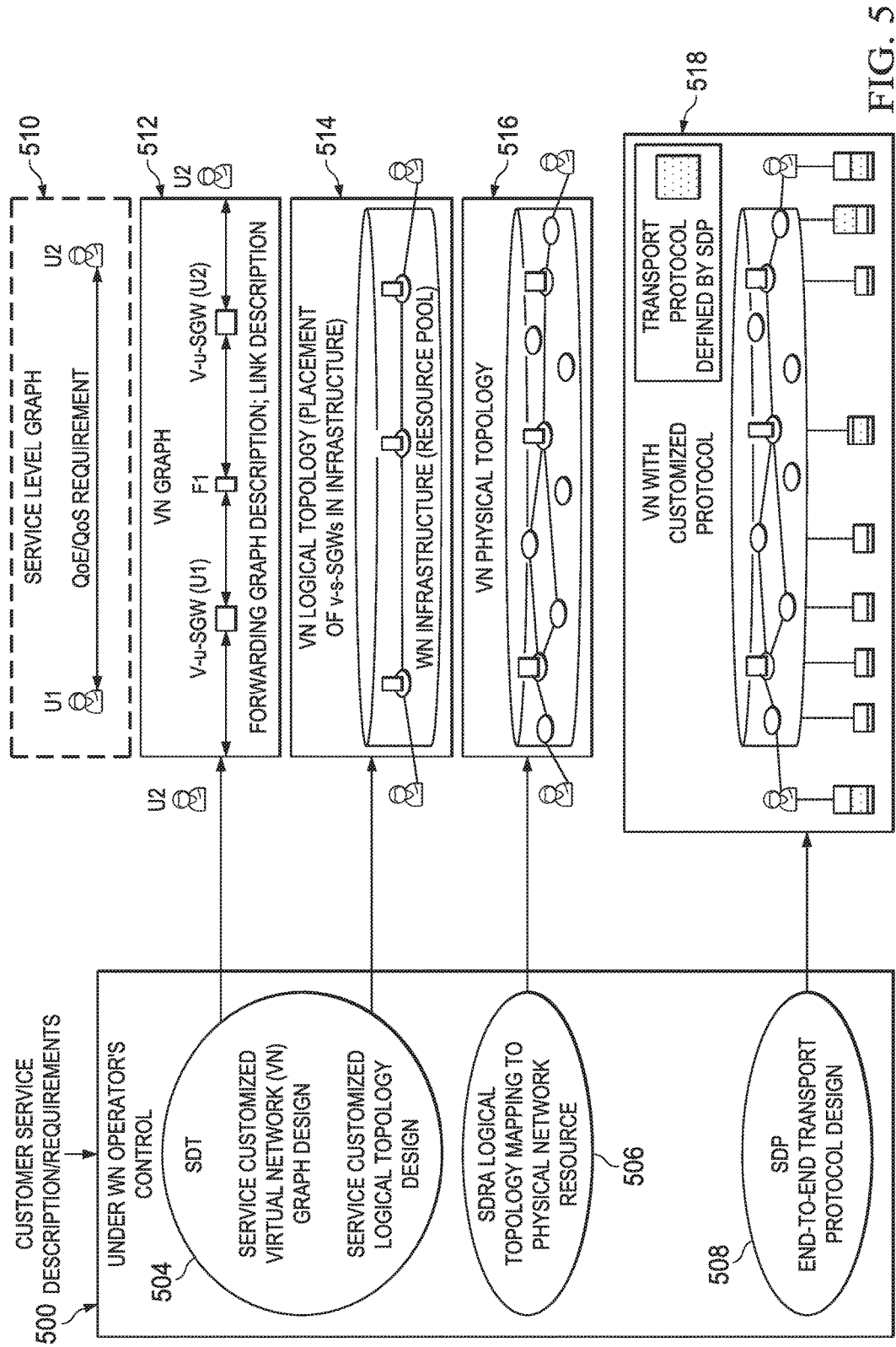
FIGS. 5-7 show an embodiment of the components of SONAC and an embodiment of the operation steps for creating an SCVN.
Figure 6:
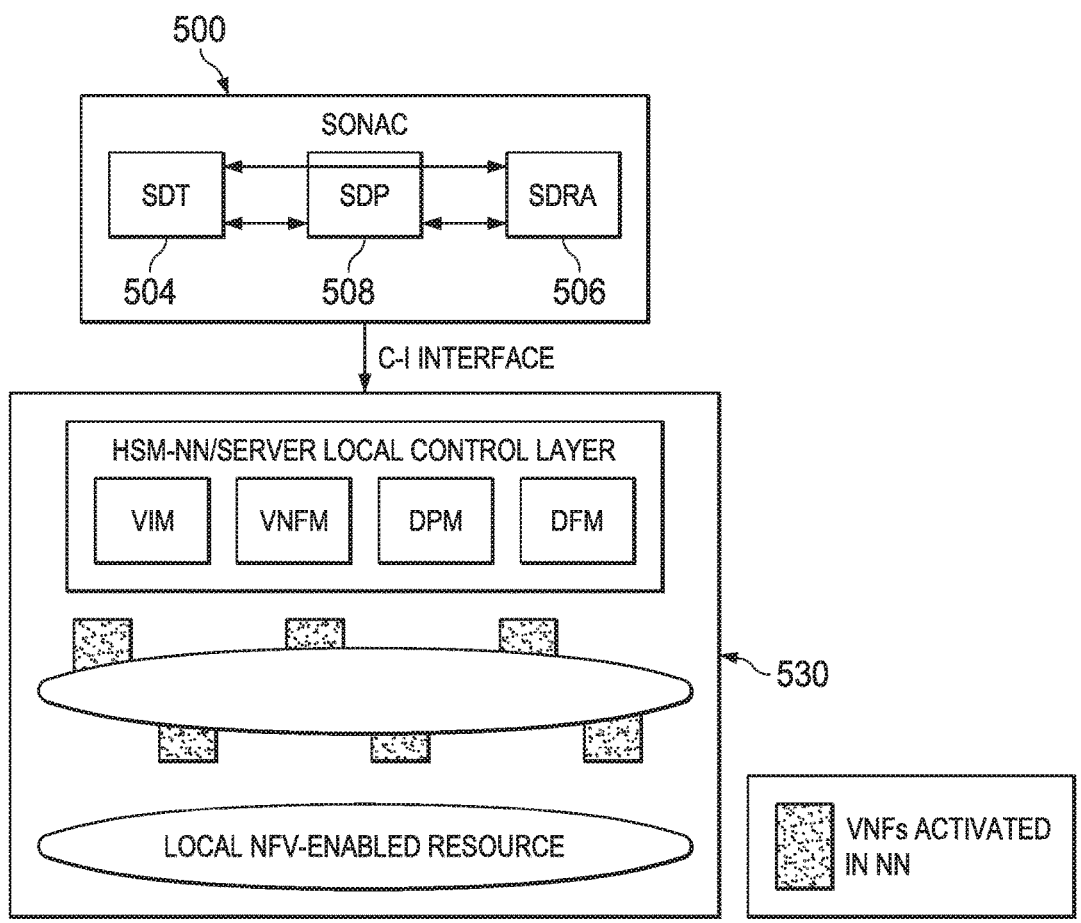
Figure 7:
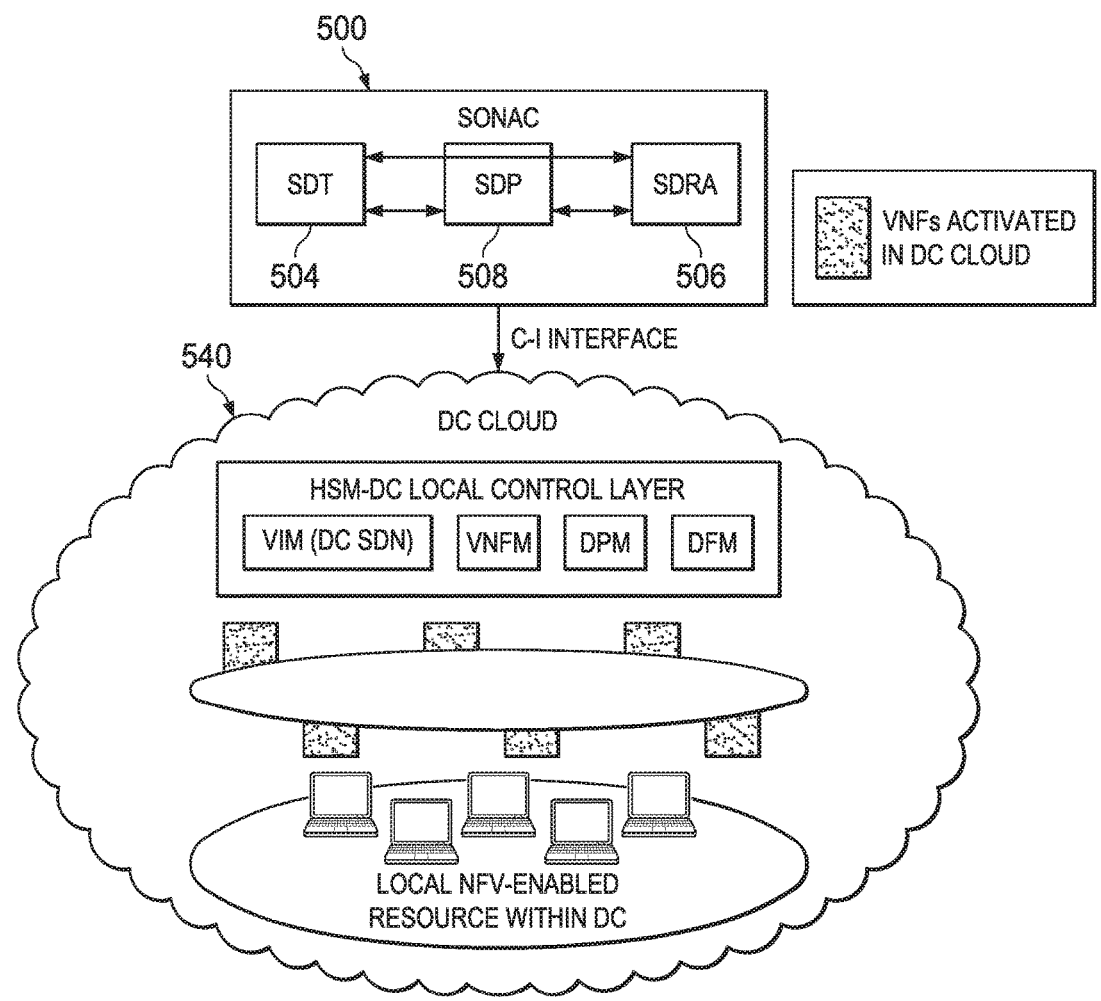

FIGS. 5-7 show an embodiment of the components of SONAC 500 and an embodiment of the operation steps for creating an SCVN. To make the illustration clearer, a two-end communication is used in these figures. However, SONAC 500 can support all types of services. In an embodiment, SONAC 500 consists of three basic functional components 504, 506, 508. They collectively enable the full automation of SCVN creation, and provide true customized virtual networks for customers and operators.

Software Defined Topology: For each service, an industry service or an individual mobile service, given a service-level graph description and service requirement, software-defined topology (SDT) 504 determines the service-specific data processing function(s) of the v-s-SGWs, the VN graph 512, and the logical topology of the SCVN.

The VN graph 512 of an SCVN describes the interconnections between v-s-SGWs and network function elements outside v-s-SGW for data handling, and the logical association between end devices/mobiles with v-s-SGW(s). These network function elements outside v-s-SGWs (e.g., F1 in FIG. 5) could include network functions that are shared by multiple network slices. The VN logical topology 514 defines the mapping of these logical function elements to physical NFV-enabled NEs, and logical links among these function elements and quality of service (QoS) requirements over the logical links. In an embodiment, definition of a VN graph 512 and logical topology 514 must take the end-device distribution and mobility statistics, service QoE, and network topology into consideration. In some cases, an SDT algorithm will determine the VN logical topology 514 directly based on the service description and requirement. In an embodiment, full automation of this step is necessary since both static VN creation and on-demand VN adaptation should avoid human involvement. SDT 504 can be viewed as an extension of logical connection management of MME in 3G/4G.

Software Defined Resource Allocation: For a given service logical topology, software defined resource allocation (SDRA) 506 maps the logical topology 514 to physical WN resources. The resulting VN is called VN physical topology 516. This process is performed for QoE guaranteed services. SDRA 506 performs a similar function as SDN 504, but extends the resource allocation to both wired network segments and wireless access network segments. In addition, it supports both flow-based and service based resource allocation. In service-based SDRA, resources are allocated for a service (e.g., M2M service) based on the statistics of service traffic and device distribution without distinguishing between individual flows.

Software Defined Protocol: For a given service logical topology as created by SDT 504 or for a given physical resource mapping defined by SDRA 506, the software defined protocol (SDP) 508 determines the service customized E2E user plane transport protocol 518. SDP 508 may define customized protocol only for part of a VN, For example, in FIG. 5, a customized protocol may be defined only for the virtual access segment of this VN (U1<->U1's v-u-SGW and U2<->U2'S v-s-SGWs) and a common protocol may be utilized in the virtual core segment of this VN (between two v-s-SGWs).

SONAC 500 can be implemented in a hierarchical structure, as shown in FIGS. 1 and 4, to balance the complexity and reduce latency of control signaling. Considering the hierarchical topology of SONAC, each of these three components can be enabled selectively at different layers in the hierarchy. These components may run on different timescales and be triggered by different events. For example, the SDRA may run more frequently than SDT in the wireless access domain due to the more frequent changes in traffic load without the service logical topology change.

For a VN serving multiple customer services, a SONAC within the VN can be used to provide the SCVN of an individual customer.

Service customized virtual network (service slice/service instance) and creation of a SCVN.

In an embodiment, a service oriented virtual network/slice is characterized by it function graph, logical topology (cloud resource), link BW resource, and transport protocol. Multiple formats of SCVNs are possible as shown in Table 1.

TABLE 1

| SCVN | SDT (service description by customers) |||||||||||
|---|---|---|---|---|---|---|---|---|---|---|---|
| | Network graph ||| Logical topology (cloud resource) ||| SDRA ||| SDP Transport protocols (configuration) ||
| | Function Definition Central defined | Inter-connections among functions || PoP of each functions and Central defined | Logical connections among function instances || BW resource of Logical connection ||| ||
| | | ||| || Logical | Physical || ||
| | | Central defined | Central defined policy + on-line definition | | Central definition | Central defined policy + on-line configuration | Default routing table (not service specific) | Central defined | Central defined policy + on-line configuration | Default protocols (not service specific) | Central defined (service specific) |
| A | Y | Y | | Y | Y | | Y | | | Y | |
| B | Y | Y | | Y | Y | | Y | | | | Y |
| C | Y | Y | | Y | Y | | | Y | | Y | |
| D | Y | Y | | Y | Y | | | Y | | | Y |
| E | Y | Y | | Y | | Y | Y | | Y | | |
| F | Y | | Y | Y | | Y | Y | | Y | | |

Formats E and D are central-policy and local-configuration based formats.

Function graph
  Function definition: the functions to be implemented that could include function(s) defined by the customer and network functions defined by operators
    Be determined by central/remote entity (SDT)
  Inter-connections among functions: connections among functions
    Be statically or semi-statically determined by a central/remote entity (SDT)
    Or be dynamically defined by local entity based on a policy determined by remote entity (SDT). Enable a flow of a service go to different functions
Logical topology given a function graph
  PoP of each functions: a DC or any NFV-enabled network node which is selected to instantiate function(s)
    Be determined by a central entity (SDT)
  Inter-connection among functions: logical connections among PoPs and capacity requirements of each logical connection
    Be statistically/semi-statically determined by central/remote entity (SDT)
    Or be dynamically determined by a local entity based on the policy determined by central/remote entity (SDT)
Bandwidth resource of logical connection
  Logical: logical connection definition (destination of a logical connection) by SDRA-TE
  Physical: Physical resource mapping of logical connections by SDRA
Transport protocol
  Service specific protocol: service specific transport protocol is defined by remote entity (SDP) or locally determined based on the policy by central-remote SDP, default (common) otherwise.

Based on the service description (devices distribution, traffic attributes, etc.) and quality requirement of a service, SONAC defines a SCVN and interacts with GWNI for function instantiation, for link BW assignment and for transport protocol configuration. After that, a SCVN becomes ready for traffic data transmission. Note that, in an embodiment, both DC and NFV-enable NN are abstracted as one single NFV-enabled NN. SONAC will use MN as a tool to instantiate the required functions in the selected NFV-enabled NNs.

A SCVN is created for one service and can be created directly from GWNI. However, for further shorten the realization of a SCVN, a SCVN can also be created from a network slice which is formed for a group of services which share the same function graph. The procedure of the creation of a network slice from GWNI is the same as that of a SCVN, except that the "service" description and requirement are based on the 'aggregated" to be served services. When a SCVN is created from a network slice, the steps, such as graph definition, PoP determination and function instantiation, can be avoided. However, due to the different service attributes, such as, distributions of devices of a service, the logical topology of a SCVN can be determined by SONAC when needed.

In an embodiment, one more format of a network slice could only include some common network functions instantiated in some selected network location (PoP). For creating a SCVN, SONAC still needs to determine the graph and logical topology but the step to determine the PoP of functions can be avoided.

SONAC techniques can be used to create a SCVN directly from GWNI or from network slices, and also he used to create any formats of network slices from the GWNI.

SONAC and MN-Enabled NE

FIGS. 6 and 7 show the interaction of SONAC 500 with an NFV-enabled network node 530 and the DC cloud 540, respectively. In FIG. 6, SONAC 500 determines which VNFs need to be created, the data process chain within the NE for a given service, and the forwarding rule for the VN's data. For the interaction between SONAC and a DC cloud (FIG. 7), the operation steps are similar to the interaction between SONAC and an NFV-enabled NE. In an embodiment, the only difference is that SDN within DC may be needed for interconnections among servers.

Relation between SONAC, MANO, and SDN

As in MANO, SONAC may require a repository of predefined virtual functions. However, unlike MANO, SONAC can fully automate the service VN topology creation according to the request of customers/operators without any human involvement. This request includes device (mobile) distribution, mobility statistics, service traffic statistics, service QoE requirements, service-specific function, and so on. SONAC is itself a hierarchical logical topology to balance the complexity and to reduce latency of control signaling. SONAC defines an end-to-end transport protocol to adapt customer service types and traffic characteristics. SONAC manages the E2E resource allocation not only for traffic flows, as in SDN, but also for industry services, such as IoT/M2M services. SONAC focuses on the decision making in the SCVN design without touching the embedment of a described SCVN into the NVF-enabled infrastructure. SONAC relies on VIM and VNFM for VNF instantiation, monitoring, and management within MN enabled NEs. ETSI NFV ISG has done a tremendous job to specify the instantiation and maintenance of VNFs in a virtual infrastructure environment, and these are used by the SONAC in MyNET.

Network Management Functions in MyNET

These functions in management plane include both existing core network functions, with some of them being enhanced or extended, as well as new functions.

Infrastructure management: The key task of this function is to manage the infrastructure resource pool. Infrastructure management (InfM) provides an active infrastructure layer on top of the deployed infrastructures provided by single or multiple infrastructure providers to ensure that the deployed network infrastructure resources are efficiently used on an on-demand basis. InfM interacts with SONAC, via interface C-M, for infrastructure topology change (e.g., integration of DCs or private networks).

Connectivity management: In an embodiment, one key task of connectivity management (CM) is to enable full reachability of user equipment (UEs)/devices and provide everywhere-local capability. Everywhere-local service means that a user/UE registers to a third party without permanently coupling with any particular operator (home network). This service will require cooperation among WNOs to enable worldwide reachability of a user/UE. The location tracking of a UE/device is managed in a hierarchical structure. The hierarchy includes a global or third party CM, a local CM, and a virtual per UE/device CM (v-u-CM), which is at the lowest level of the hierarchy. A CM communicates with SONAC via C-M interface for customer service VN update. Connectivity management for different services (e.g., IoT service and MBB service) require different schemes. CM must be redesigned and should be customized for different services.

Customer service management: The task of customer service management (CSM) is to provide IoT/M2M service and conventional individual related service management. CSM can be viewed as an extension of MME and PCRF in 3G/4G. In an embodiment, CSM is redesigned as compared to 3G/4G and is service customized since different service types require different CSM functions. For example, in an embodiment, CSM of emerging IoT/M2M services must be service oriented, as opposed to device oriented as found in 3G/4G.

Cache and forwarding management (CFM): In an embodiment, the WN architecture is content-friendly. One approach to achieve this is for the operator to create a content cache and forwarding virtual network (CF VN) on top of the GWNI. Cache and forwarding management (CFM) is designed for this purpose. One example of the CF VN is a CCN VN that includes virtual CCN servers performing CCN protocol. An ICN VN is transparent to end devices/mobiles. The v-s-SCMs/v-u-SGW will perform protocol translation.

Data analytics management: Operations of SONAC and various management functions strongly depend on the availability of sufficient and accurate information of network status and the real-time experiences of consumers. Data analytics technology aims to provide the required information by analyzing huge amounts of logged data. Configurable and on-demand data logging and intelligent data analysis are the main tasks of data analytics management (DAM).

The key functionalities of each network management function/service for one embodiment are summarized in Table 2.

TABLE 2

| Network management nlock | Key Functionalities |
| --- | --- |
| InfM | Resource coordination among multiple operators |
| | Private DCs integration/private network integration |
| | Wireless backhauling (long-term) configuration |
| | Network node/DC management and configuration |
| | Infrastructure abstraction |
| CM - service customized (reachability of a device) | Service-customized location tracking/prediction using user-specific and adaptive location tracking schemes |
| | Provisioning of the location information of a device/mobile to SONAC for logical topology update (v-u-SGW migration) to adapt to the new location of a device/mobile |
| | Service-customized MAC state management |
| | Support of handover between networks (location tracking as a service) |
| CSM - service customized (service management of a customer) | Service-customized network access protection - Joint -$3^{rd}$ party authentication and key management, network operators, customers and devices. |
| | Service-based charging at anchor point of a service, e.g., v-s-SGWs |
| | Service-based QoE assurance |
| | Service-based and collaborative context maintenance among operators |
| CFM | Management of CF VN |
| | Sense the content popularity |
| DAM | On-demand data logging and intelligent data analysis |

Use Cases of MyNET: Customer Services

Virtual Service-Specific SGW and Customized M2M Virtual Network Elastic Edge VN: Some M2M services, such as utility meter reading, can be treated as a single service, although these services may involve a large number of devices. Due to the diversity in machine distribution, traffic characteristics, and data process requirements of M2M services, designing an SCVN for an M2M service that requires specific data handling necessitates the use of service-specific SGWs. In the process of creating a service-specific user plane logical topology, the SDT determines the logical connections among these v-s-SGWs and placement of the v-s-SGWs in infrastructure. For some M2M services, the v-s-SGWs may include functions that collect information from machines, analyze the information, and possibly react to control the machines based on the analyzed results. In this case, the requirement for reaction latency is usually critical. These v-s-SGWs should be pushed and pulled back from the WN edge based on the requirements for reaction latency and cloud resource load at the edge, resulting in an elastic edge VN.

Figure 8:
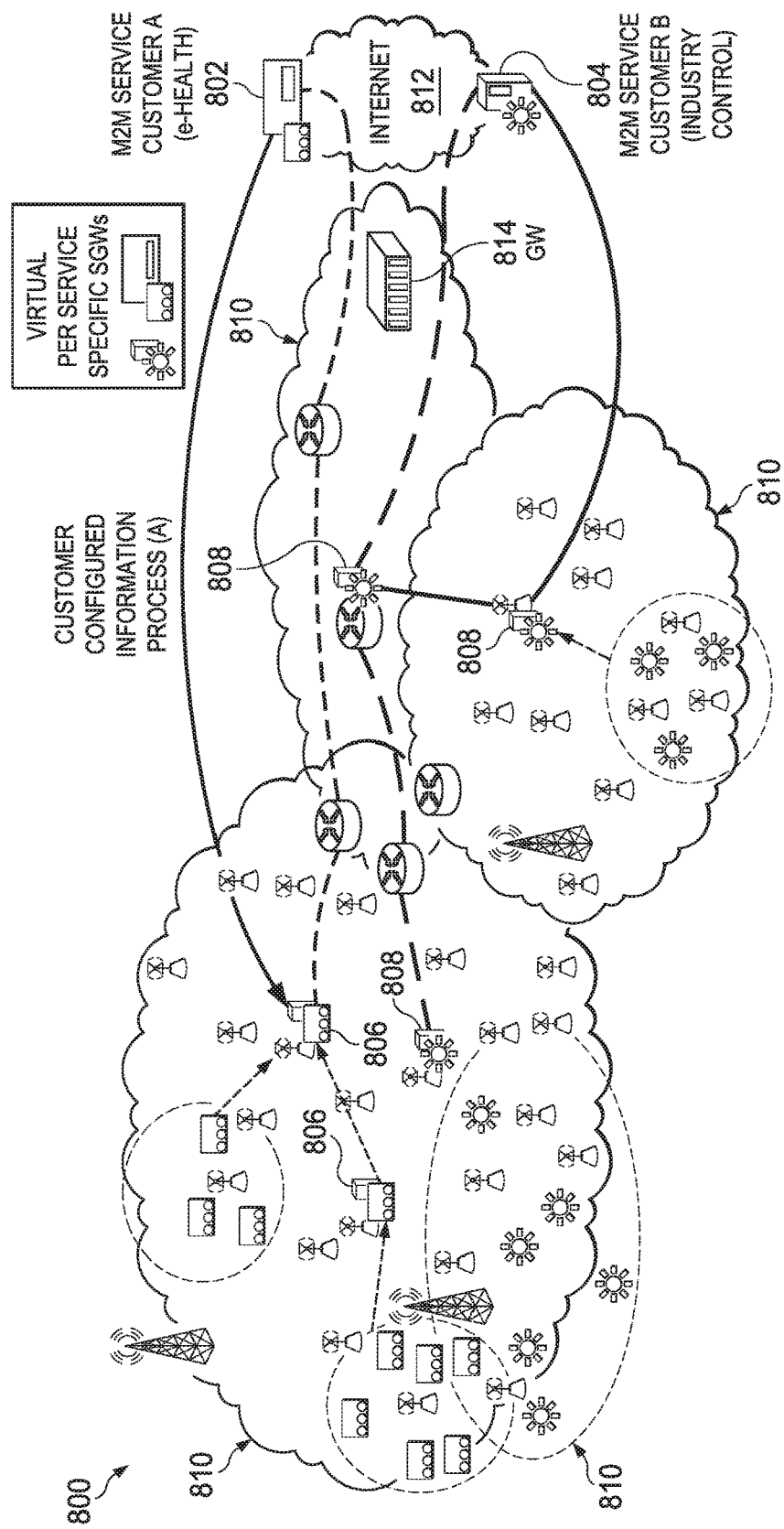
FIG. 8 is a diagram showing a use case of an embodiment of a SCVN for M2M service VN.

FIG. 8 shows examples of service-customized VNs of M2M services in a network 800. Network 800 includes a M2M service 802 for customer A, M2M service 804 for customer B, a plurality of virtual per service specific SGWs 806 for customer A, a plurality of virtual per service specific SGWs 808 for customer B, a plurality of domains 810, a GW 814, and the Internet 812. The gateway 814 connects the domains 810 to the Internet 812.

Figure 9:
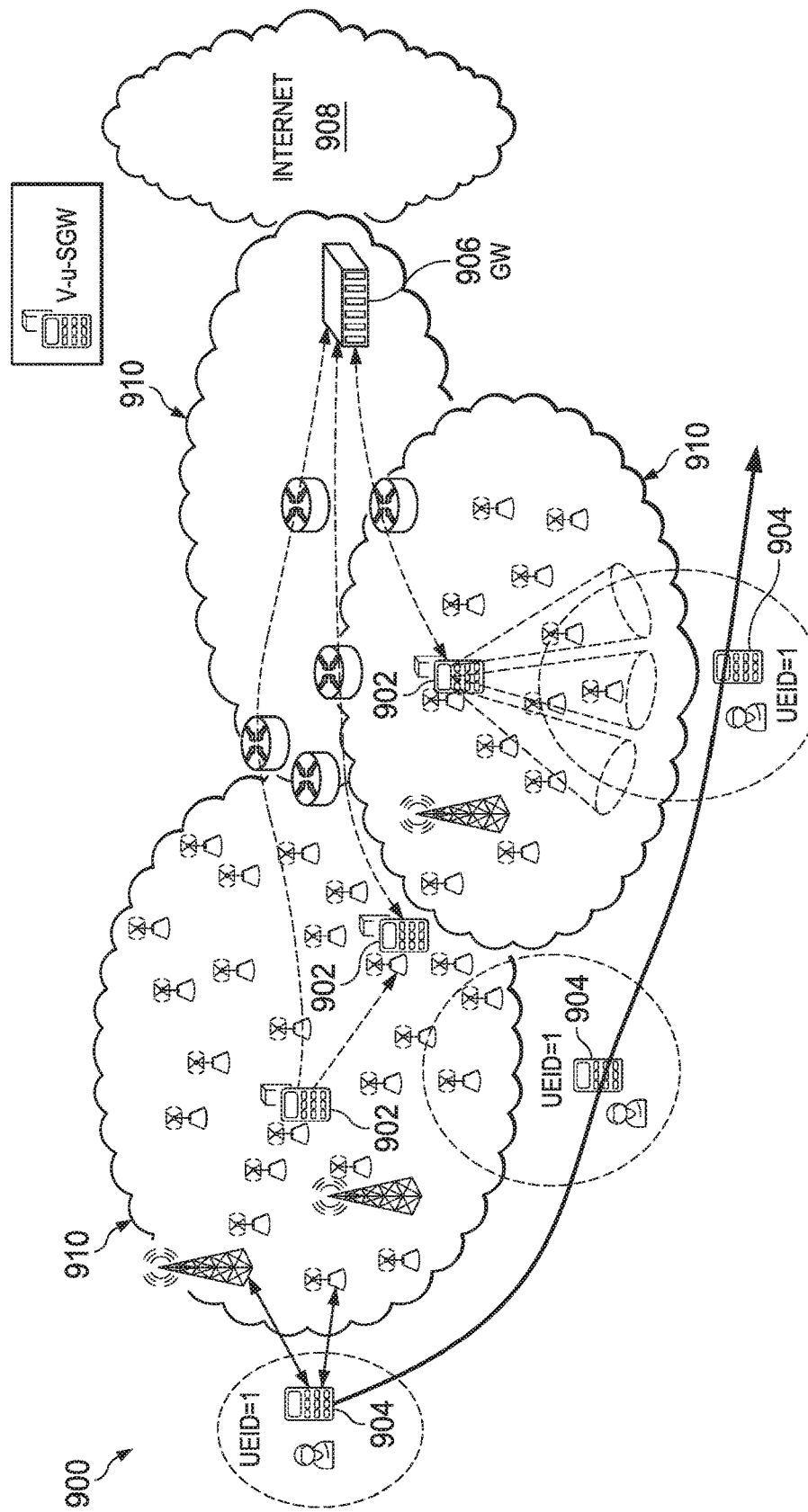
FIG. 9 is a diagram showing a use case of an embodiment of a SCVN for mobile VN migration.

FIG. 9 shows an example of a use case for SCVNs for mobile VN migration in a network 900. Network 900 includes a plurality of domains 910 connected to the Internet 908 via a GW 906, a plurality of V-u-SGWs 902 and a UE 904. The UE 904 is in motion and connects to various TPs and APs as it moves through the network 900.

Virtual UE-Specific SGW and Customized Mobile User Virtual Network—VN Migration: This is a case where a virtual network is designed for a user. For a UE, after network entry, a v-u-SGW is defined. The v-u-SGW is virtual and associated with the UE until the UE deregisters. The v-u-SGW is configured to perform certain UE/user-specific functionalities and migrate along with the UE. From the UE point of view, the vu-SGW is a default GW, while from the network point of view the v-u-SGW is a virtual UE (refer to FIG. 9). The functions in a v-u-SGW can be configured by the operator and user. In addition to acting as a mobility anchor, the v-u-SGW can be used as a convergence point for different access link specifications, holder of UE network access key material, and so on. In this example, a VN is created for a user by an operator from GWNI. Such a VN can also be created within an MBB VN using a SONAC within the MBB VN.

Use Cases of MyNET: Management Function Services

Figure 10:
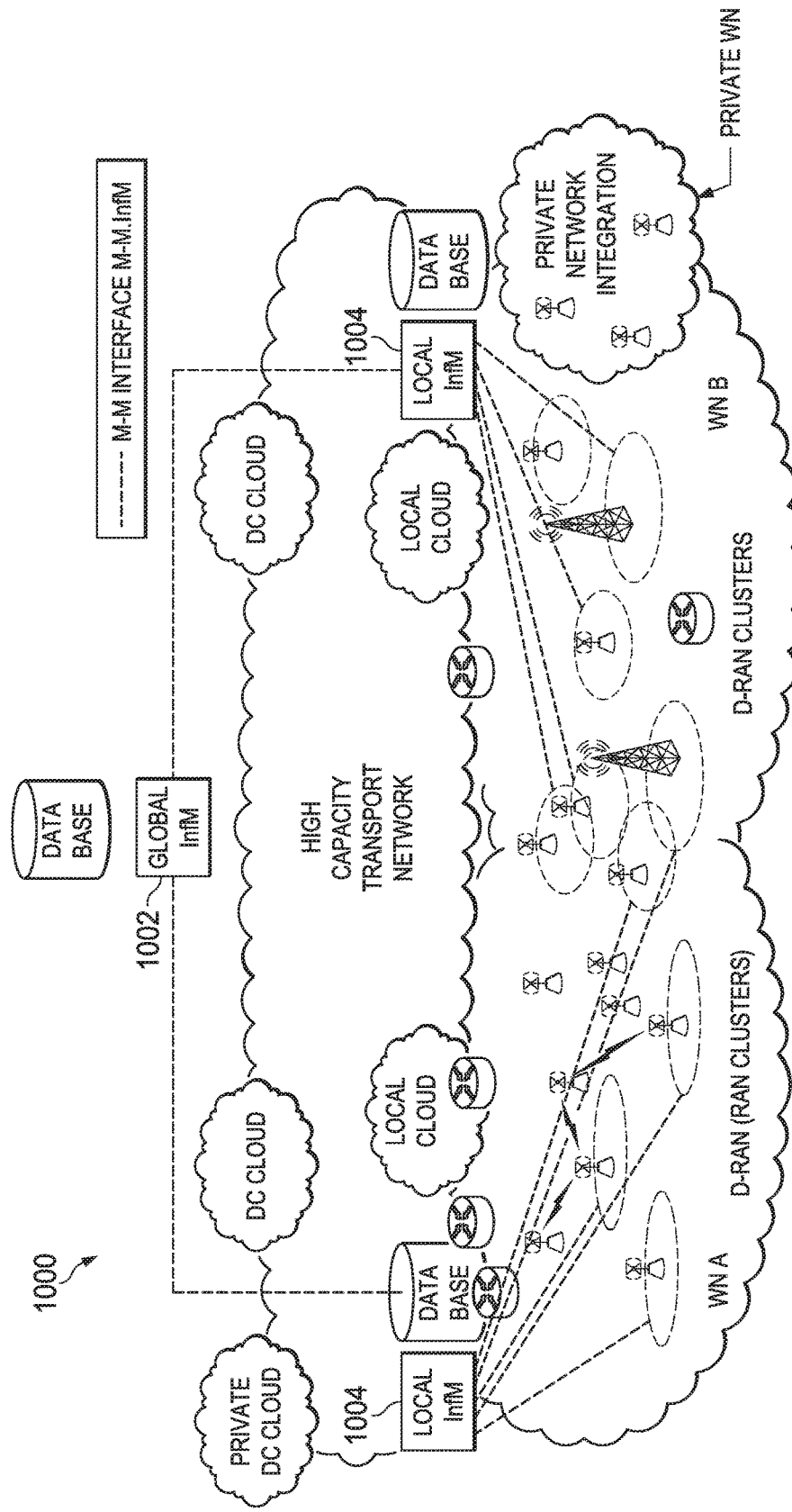
FIG. 10 is a diagram of an embodiment of an infrastructure management function architecture/topology.

Infrastructure Management Function Service: One example of infrastructure management function architecture/topology 1000 is shown in FIG. 10.

A global/third party InfM 1002 configures the radio resource for network nodes that are operated by different operators but co-located in a certain area. An InfM is also responsible for long-term radio resource management of its wireless backhaul network. Based on demand, InfM manages the integration of private DCs resources and private network resources. The configuration messages transmitted among global InfM 1002, local InfM 1004, and network nodes are carried by M-M interface.

Figure 11:
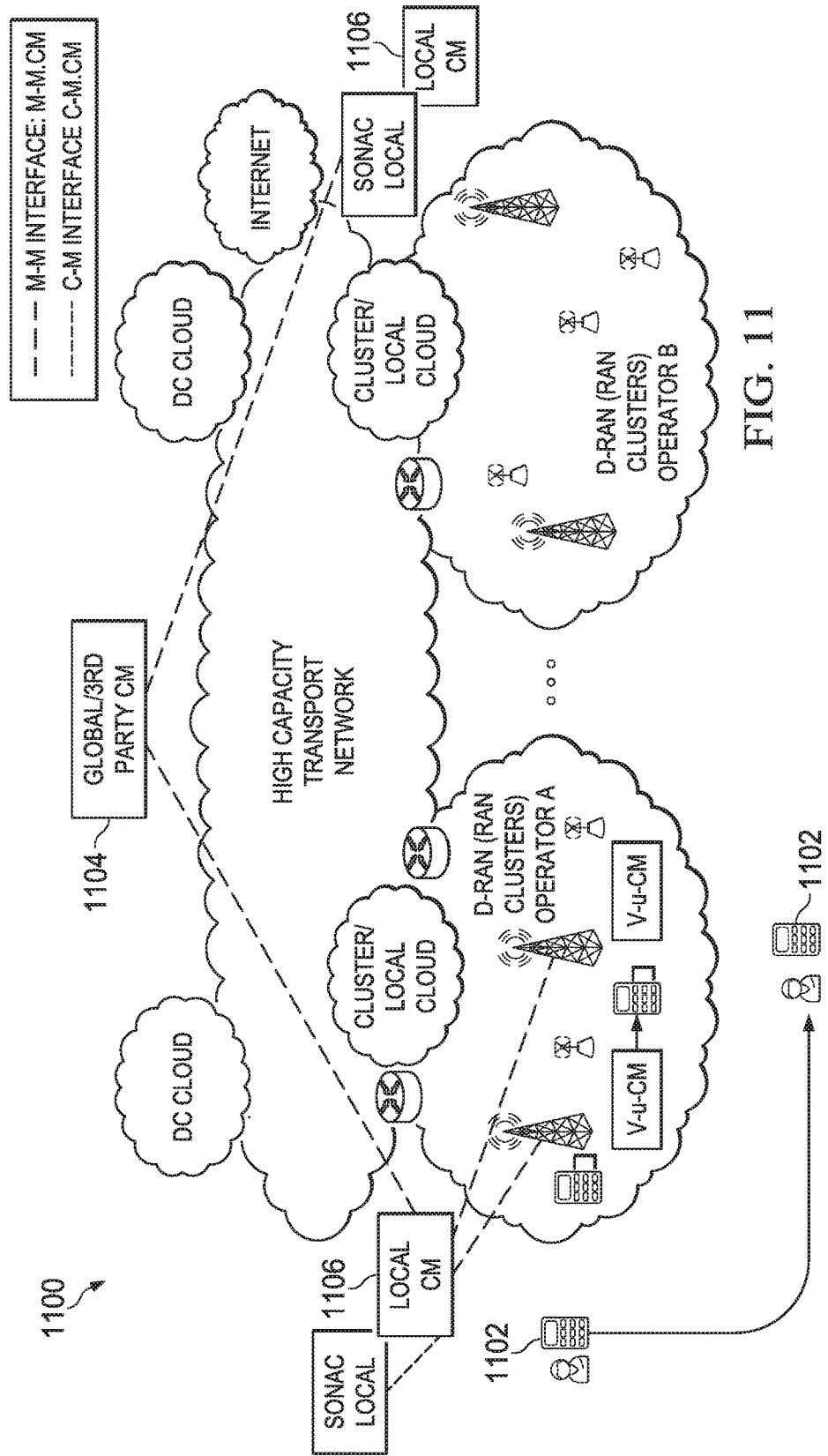
FIG. 11 is a diagram of an embodiment of CM function architecture.

Customized Connectivity Management Function Service: FIG. 11 shows an embodiment of CM function architecture 1100. To support full reachability of UEs/devices 1102 and to enable everywhere local feature, for each UE/device 1102, a third party CM 1104 maintains the corresponding network ID that is currently serving the UE/device 1102. In each network and for each UE/device 1102, one local CM 1106 maintains the information of the v-u-SGW of the UE/device 1102, including the network address of the NE hosting the v-u-SGW. A v-u-CM can be created and used for tracking the location (relative to the network) of a UE/device. The function of a v-u-CM is to measure, estimate, and predict the location of a UE/device through a customized location tracking scheme and to communicate with SONAC for deciding the right set of DL forwarding paths if needed. The local CM 1106 can trigger the migration of a v-u-SGW. This scheme is used for connectivity management of all mobiles or mobiles within an MBB VN via a CM within the MBB VN.

FIGS. 12-21 illustrate an alternate embodiment of a SONAC system and example uses. To make network control and management scalable, a network can be divided into regions or areas or other geographical entities. The architecture 1000 of network control and management thus is a hierarchical one, as shown by way of example in FIG. 1 and described above.

Figure 12:
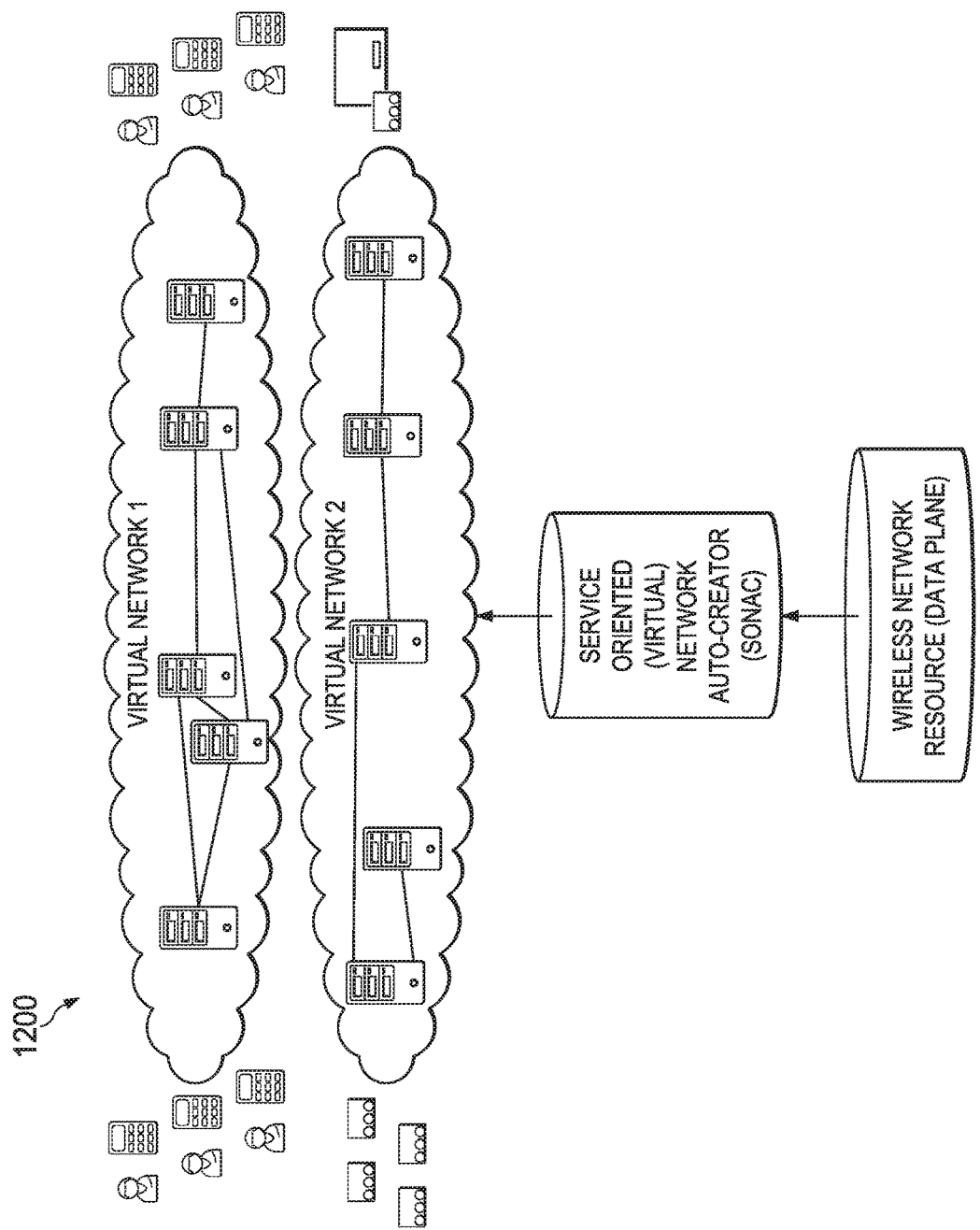
FIG. 12 is a schematic depiction of an embodiment of a system with a SONAC for providing customized virtual networks.

FIG. 12 is a schematic depiction of an embodiment of a system 1200 with a SONAC for providing customized virtual networks. The system(s) and method(s) disclosed herein implement a logical function oriented design. Logical function oriented design means identifying the basic logical functions, and placing them in a network based on demand. This principle is applicable to both the data plane and the control/management plane. As shown by way of example in FIG. 12, the multiple logical control/management functions can be defined and may be put into and distributed into multiple containers of functional elements.

The diversity and variability in service requirements will preclude a 'one-size-fits-all' solution and will thus require a flexible design to provide service customized solutions. The system disclosed herein provides a service-oriented network. The service-oriented model of this network is designed to address one or more of the following (1) ensuring that customer service level expectations are met; (2) providing specialized handling of traffic flows to and from wireless devices; and (3) enabling the customer to configure specialized traffic handling.

This may be accomplished by utilizing principles of Network Function Virtualization (NFV) and Software Defined Networking (SDN) to create multiple virtual networks that can be supported over a common network infrastructure where each virtual network is defined specifically for a service in order to best fit the service model and requirements.

This technology would therefore be useful in creating a future 5G wireless network able to simultaneously support different types of customers, each with specific service requirements. For example, the network could support wireless device subscribers with various capabilities and QoE requirements for human-type communications involving consumers and enterprise customers, and for machine-type communications supporting industrial, commercial and personal use. The network could also support over-the-top (OTT) application providers with specific QoE requirements for their customers. The network could also support virtual mobile network operators (VMNO) with functional, capacity and QoE requirements necessary to support their customer base.

This diversity of needs may be met in a 5G wireless network through a set of service customized virtual networks overlaying the physical infrastructure of the Mobile Network Operators (as shown by way of example in FIG. 12). In some embodiments, the control plane function, e.g. SONAC, enables service customized networks.

Traditionally, service-specific traffic process functions have been housed in specialized network elements or in over-the-top application servers. However, to deal with the diversity of wireless devices and services in 5G wireless networks, in-network processing may be exploited in order to optimize the use of both radio and network resources.

5G wireless networks will be based on the principles of SDN and NFV with enhancements to support 5G requirements. New service functions can be defined as the need arises and integrated into the appropriate packet forwarding paths of the network through a set of management tools, obviating the need for specialized functional network elements. Service-specific functions can be more easily integrated into the network and located wherever they provide the most benefit in terms of cost and performance.

Service functions may be associated with a particular service and can be tailored to the specific needs of that service. Traffic engineered paths are used to implement a customized virtual network where packet flows are forwarded through a set of network elements offering the required service functions, regardless of whether those functions are instantiated as virtual machines (e.g. on a cloud server) or as specialized network appliance nodes.

In the embodiment illustrated by way of example in FIG. 12, the service specific function elements for each of the virtual networks can be implemented in the selected network nodes to tailor the network operations in order to provide the service required quality of experience.

Wireless Networks Control and Management Logical Function Architecture

Figure 13:
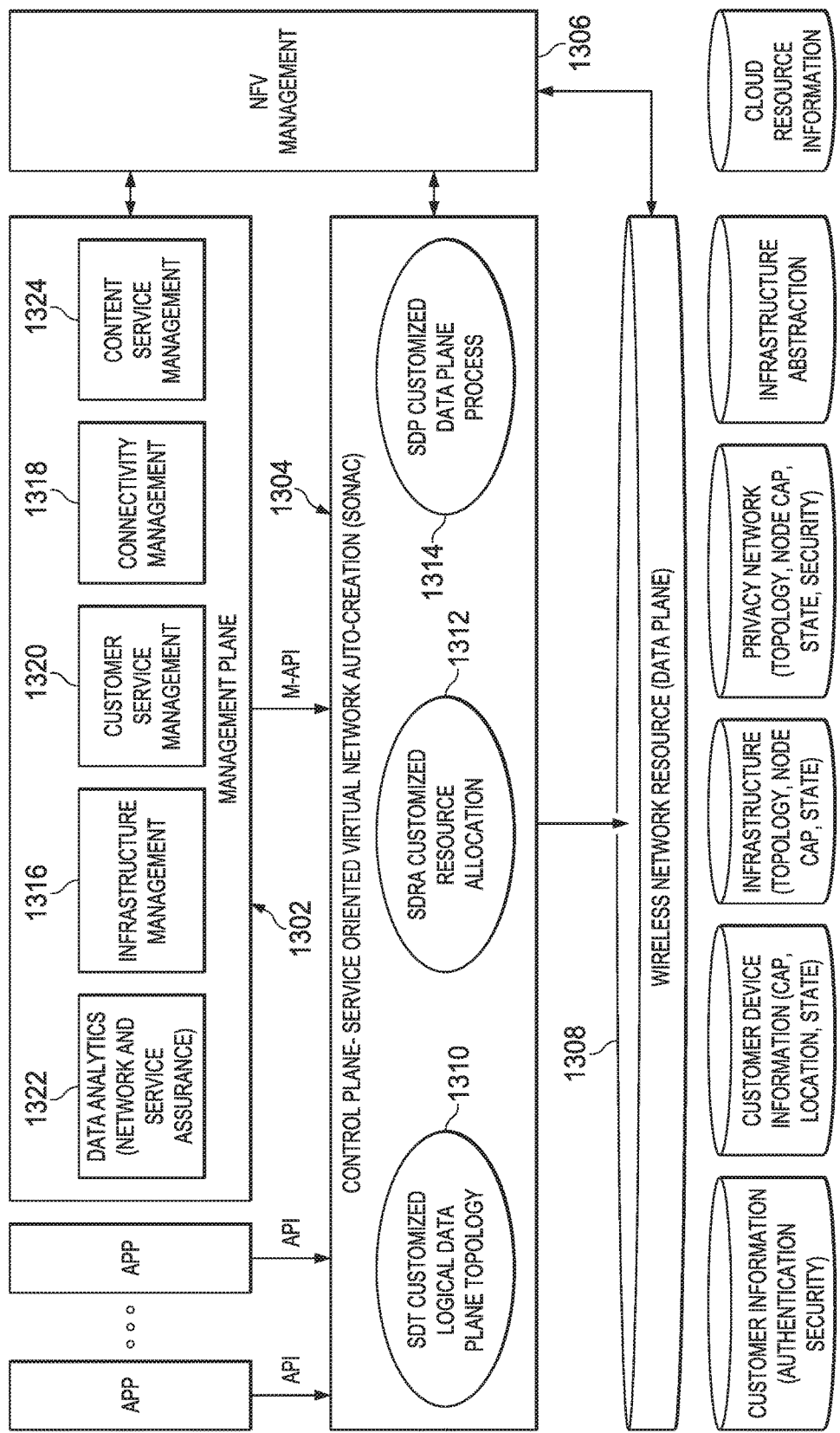
FIG. 13 is a schematic depiction of the control and management logical function architecture for an embodiment wireless network.

FIG. 13 is a schematic depiction of the control and management logical function architecture for an embodiment wireless network 1300. In order to enable service customized virtual networks, the key network management logical functions can be classified as control plane (or SONAC) functions, management plane functions and, NFV management function, as shown by way of example in FIG. 13. Customer/consumer applications and management plane functionalities 1302 interact with SONAC 1304 to obtain network resources for user traffic and management message transmissions over the data plane 1308. SONAC 1304 interacts with the data plane 1308 to provide instructions on resource assignments and end-to-end data plane 1308 processes for each individual service/application. The NFV management component 1306 provides the NFV service to SONAC 1304.

Control plane functions—Service Oriented (Virtual) Network Auto-Creator (SONAC)

The task of the control plane 1304, e.g. SONAC, is to provide service customized virtual networks for services that require specialized handling of traffic or have strict QoE requirements. The control plane 1304 interfaces via API with services/applications for the negotiation on service requirements; interfaces with the data plane to provide instructions for virtual network creation for services. SONAC includes three basic functional components:

(1) Software Defined Topology (SDT) 1310

For each service, the SDT 1310 defines the service specific data processing function(s) to determine the placement of those defined logical functional elements in the network and to define the logical topology of those logical functions. The SDT 1310 also communicates with NFV management components to request the creation of logical functions.

(2) Software Defined Resource Allocation (SDRA) 1312

For a given service customized logical topology, the SDRA 1312 maps the logical topology to physical wireless network resources.

(3) Software Defined Protocol (SDP) 1314

For a given service customized physical resource mapping, the SDP 1314 determines the end-to-end data plane transport process. The SDP 1314 technique includes breaking the boundary of protocols, redefining the basic logical functional units and, for each service, determining a set of basic units for the end-to-end data transport.

In an embodiment, these three functions (collectively referred to as the SONAC technique) are key to providing true on-demand and customized virtual networks.

Management plane logical functions 1302:

Infrastructure management 1316:

Infrastructure management 1316 manages the wireless access network infrastructure configuration and integration. Its main task is to provide an 'active' infrastructure on top the deployed infrastructure to ensure that the deployed network infrastructure resources are efficiently used on an on-demand basis. The management includes the following aspects: 1) the adaptation of infrastructure to traffic load, given the knowledge of the capability of the network nodes, real-time traffic load or predicted traffic load migration, and 2) on-demand integration of infrastructures of multiple operators/private operators and customers' devices. The infrastructure management component communicates with SONAC 1304 to provide required information, such as an 'active' infrastructure.

User/mobile/device/machine connectivity management 1318:

In future wireless networks, due to the need of the always-on connectivity while mobiles are on the move and, due to the introduction of dense RAN infrastructure, connectivity management becomes a crucial challenge. Connectivity management 1318 includes the following aspects: 1) To perform user customized location tracking/prediction using the user specific and adaptive location tracking schemes, 2) To provide the location information of a mobile to SONAC 1304 for resource mapping and logical topology determination to adapt to the new location of a mobile.

Customer service management 1320:

Customer service management 1320 is to manage customer contexts and maintain policies to assure the required QoE of service delivery. The main functionality includes customer service related functions such as service authorization, customer context maintenance, service negotiation, QoE assurance, billing, etc.

Data analytics 1322:

Control plane functions and various management plane functions strongly depend on the availability of sufficient and accurate information of network status and the real-time experiences of consumers. Data analytics 1322 technology provides the required information by analyzing a huge amount of logged data. On-demand and configurable data log and intelligent data analysis are the main tasks of data analytics.

Content service management 1324:

Content service management 1324 is to manage content cache and distribution within the wireless network to improve the customer experience. The main functions include content popularity analysis, content freshness maintenance, etc.

NFV management 1306:

Based on the description of virtual function and placement, the NFV management 1306 creates the required virtual functions in the indicated places. A centralized NFV management 1306 may be implemented. In some case, the distributed and localized NFV management 1306 may be implemented where a group of NFV-capable network nodes or even each NFV-capable network node could have an NFV manager.

How to Create Service Customized Networks

Figure 14:
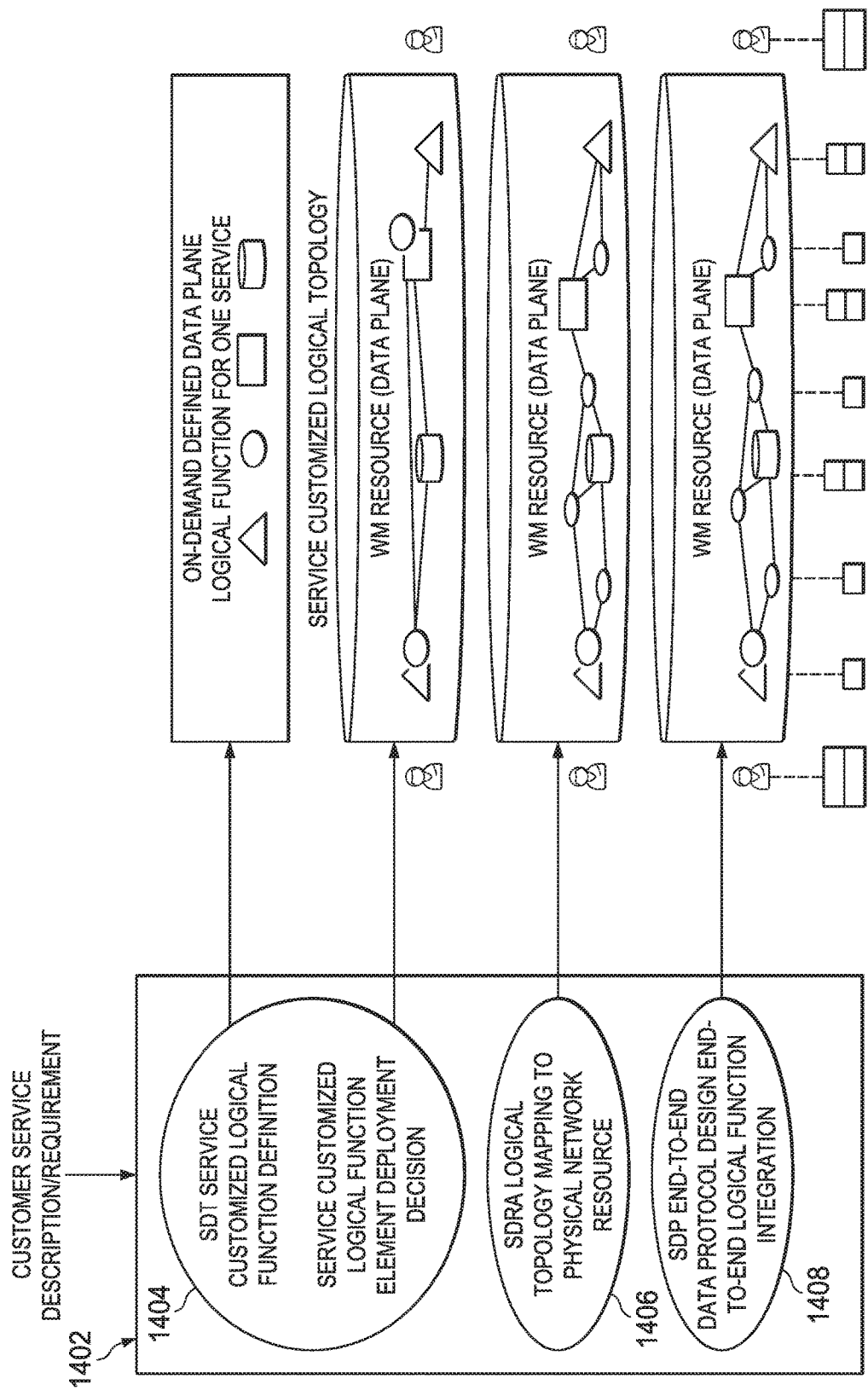
FIG. 14 schematically depicts an embodiment of the creation of a service customized virtual network for a customer service.
Figure 15:
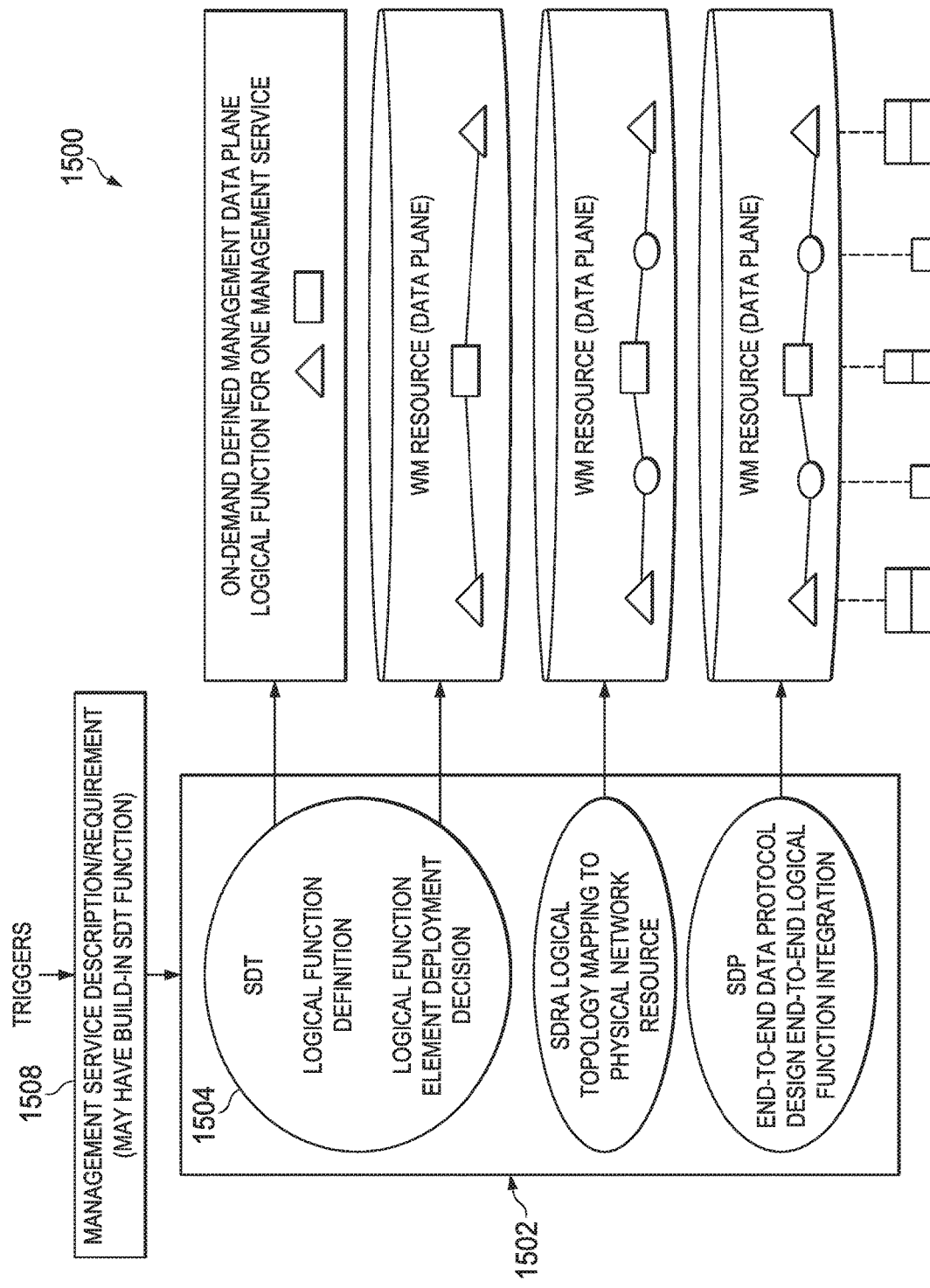
FIG. 15 schematically depicts an embodiment of the creation of a service customized virtual network for a management service.

FIGS. 14 and 15 depict how a customized virtual network is created by SONAC. FIG. 14 illustrates an embodiment of a method 1400 for SONAC 1402 to create a service customized network for customers. SONAC 1402 receives the description and QoE requirements of a customer service. SDT 1404 determines the service customized logical topology, including the service customized logical functions, the placement of these logical functions in the data plane and, the capacity requirements of logical links among these logical functions. The NFV manager instantiates the required virtual network functions (VFN) in the corresponding network nodes. SDRA 1406 then maps the logical topology to physical network resource. SDP 1408 determines the end-to-end data plane process.

The network management components in the management plane usually need network resources for their operation. For example, the infrastructure management component needs to configure network nodes, the customer service management component may need to poll a customer's QoE, the connectivity management component needs to acquire mobile location information, the content management component needs to populate content into the network, and the data analytics component needs to log data from network nodes. If these operations have strict QoS requirements and need some specific data handling, the management plane components need customized virtual networks for their operations. Therefore; they can be viewed as special services. A management component may involve in defining its logical functional elements and suggesting logical function topology of the management service virtual network.

In this case, self-defined management architectures are enabled. FIG. 15 depicts an embodiment method 1500 of how to create a self-defined management service virtual network.

On-demand data analytics 1508 is presented as one example of a management service. The data analytics component 1508 may log network status at an on-demand basis, e.g., periodically log traffic load status. The data analytics component 1508 needs to determine what to log and where to log. This can be viewed as a build-in SDT 1504 of data analytics component. SONAC 1502 then creates the corresponding virtual network for the purpose of traffic load log and analytics for data analytics service.

To make the network control and management scalable, a network can be geographically divided into regions or areas or other geographical entities. The architecture of SONAC and other management plane components thus is a hierarchical one, as shown by way of example in FIG. 1. For the purpose of resource management, in the hierarchy of SONAC, the lower tier is abstracted and details are hidden to the higher tier.

Various exemplary use cases are now described in order to demonstrate some of the possible applications and uses of the technology.

Figure 16:
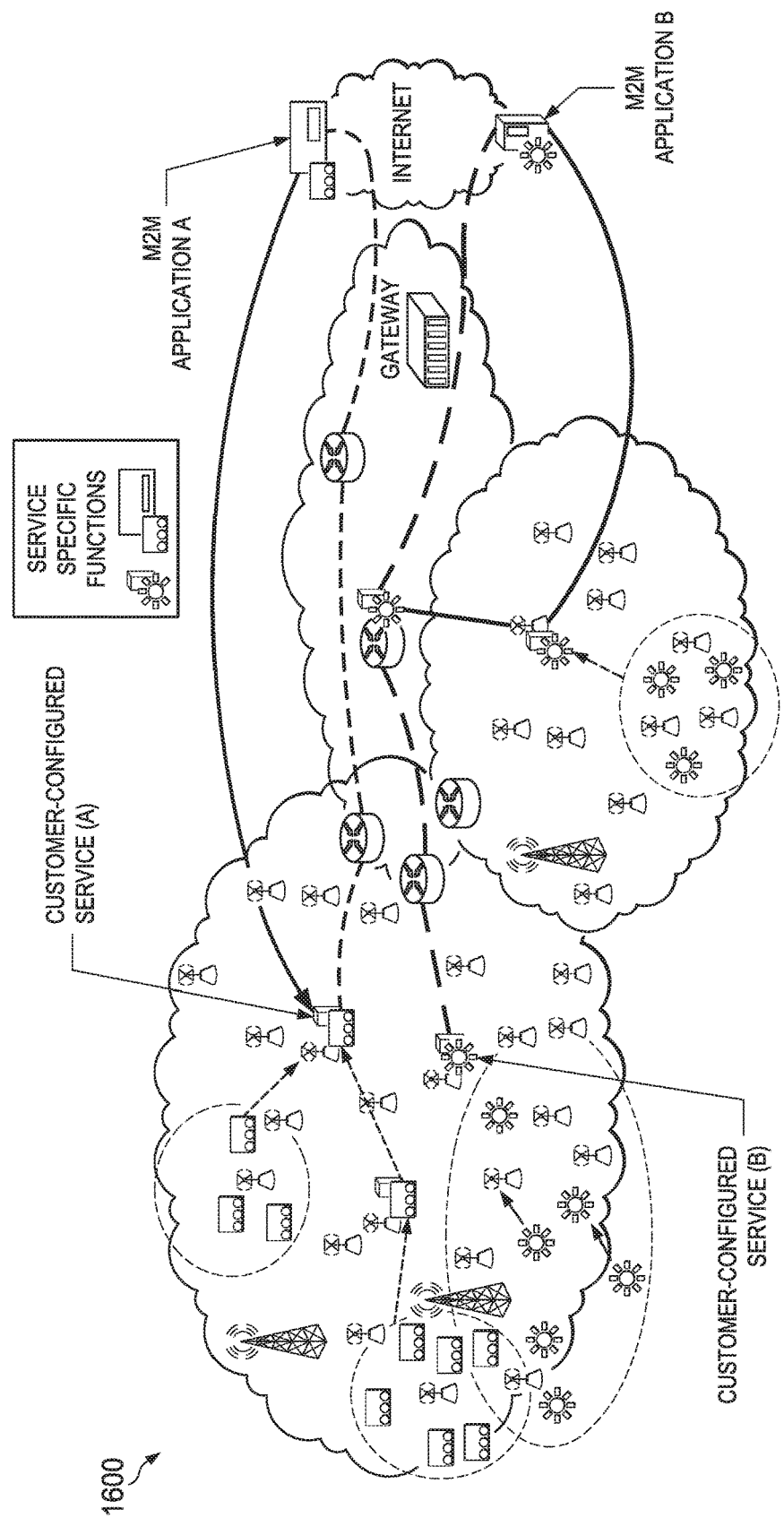
FIG. 16 schematically depicts an embodiment of customized M2M networks.

Example Use Case #1: tual Service Specific SGW and Customized M2M Network Architecture—Elastic Edge VN For most of machine-to-machine (M2M) types of services, such as a meter reading service, vehicle monitoring service, tele-health monitoring service, although these services involve a large number of devices, the service may be modeled in an aggregate sense as a single service. Due to the huge diversity in machine distribution, traffic characteristics and data processing requirements of M2M services, when a service customized virtual network is designed for an M2M service that requires specific data handling, service specific SGW are introduced. These serving gateways (SGWs) are virtual and service specific or SGWs (v-s-SGWs) and can be dynamically instantiated and terminated, adapting to the M2M service traffic dynamics. The logical connections among these v-s-SGWs and the logical connections from each of the machines to a v-s-SGW create the service specific data plane logical topology which is determined by the SDT. The logical function in a v-s-SGW can be defined by operators or the M2M service customer to satisfy customer specific requirements. For some M2M services which collect information from machines, analyze information and react to control machines' behavior based on the analyzed information, it is highly desirable to minimize reaction latency. These v-s-SGWs should be pushed and pulled back from the wireless network edge based on the reaction latency and the data processing requirements. This presents an elastic edge VN of the service. FIG. 16 schematically depicts an embodiment of customized M2M networks 1600 and shows examples of service customized virtual networks of M2M applications.

In this scenario, a group of Machine-Type Communications Devices (MTCD) report information on a periodic basis to an M2M Application hosted on a server outside the wireless network. The functionalities of the v-s-SGWs defined to an M2M Application Provider (A) may include the following service functions:

(1) Information Filtering: The M2M Application identifies an application-specific information filter to be applied to every MTCD packet to ensure that the Application only receives information it is interested in.

(2) Information Classification: The M2M Application identifies an application-specific classification scheme to be applied to every MTCD packet to determine the relative importance of the information. The different categories are associated with different QoS specifications.

(3) Packet Aggregation and Encapsulation: The MTCDs may be low cost, generic devices that do not include a full internet protocol (IP) stack. Small packets received from a number of MTCDs can be aggregated together and encapsulated for delivery to the M2M Application.

Another M2M Application Provider (B) may be provided with a different virtual network overlay, incorporating a different set of service functions, according to the needs of the Application and the capabilities of its MTCDs.

Example Use Case #2: Virtual UE-Specific SGW and Customized Mobile User Virtual Network with VN Migration For a UE (user' equipment or mobile device), after the network entry, the virtual UE specific SGW (v-u-SOW) is defined. The v-u-SGW is virtual and carries software defined functionalities, which are associated with a registered UE; it can migrate along with the UE.

Figure 17:
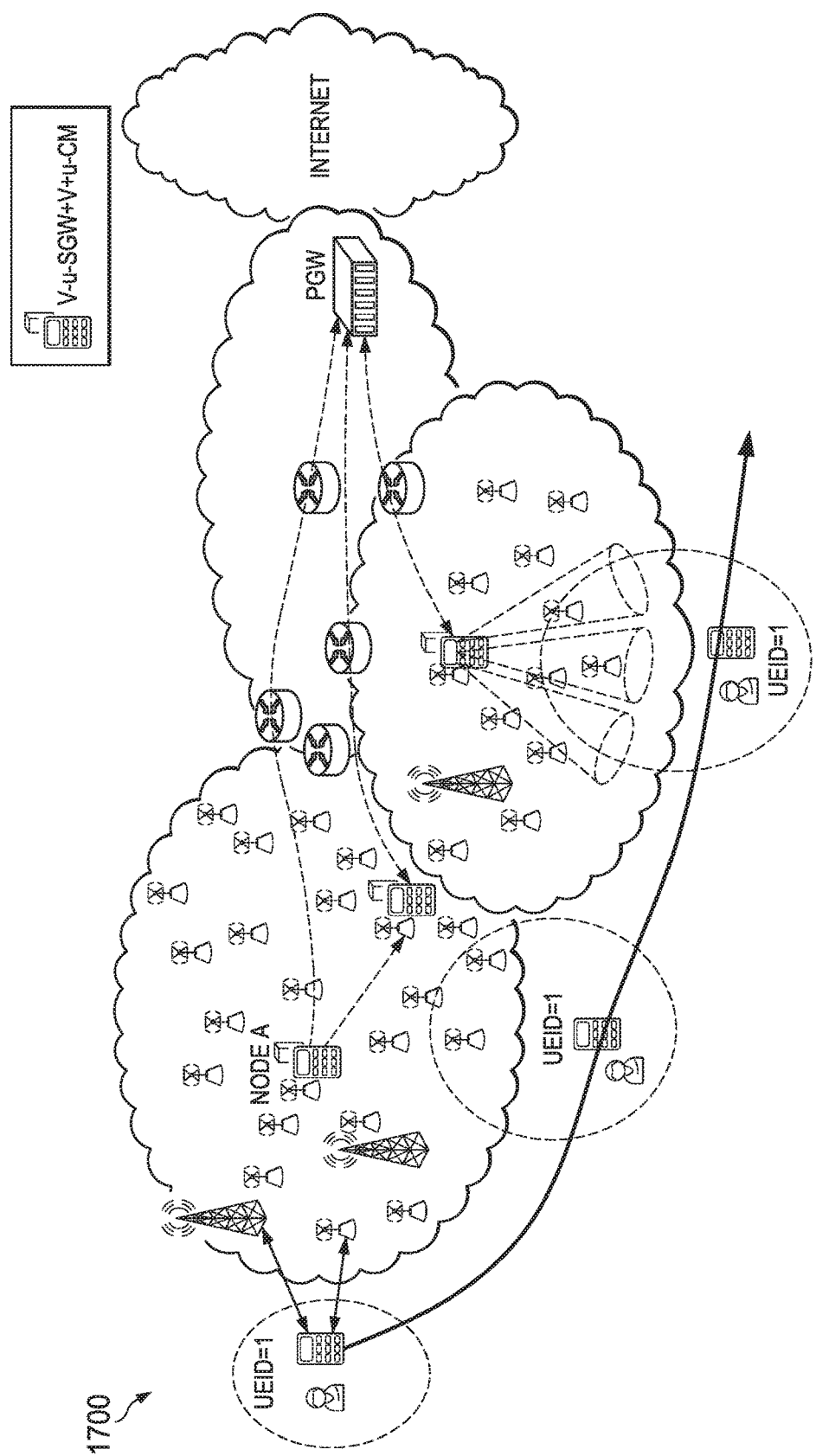
FIG. 17 schematically depicts an embodiment of a virtual network for a mobile device and the migration of the mobile virtual network.

FIG. 17, which schematically depicts an embodiment of a virtual network 1700 for a mobile device and the migration of the mobile virtual network. The v-u-SGW is a UE-specific anchor point and the function of the v-u-SGW is fully customized to the UE. From the UE point of view, the v-u-SGW is a default GW, while from the network point of view the v-u-SGW is a 'virtual UE' as depicted by way of example in FIG. 17. The functions in a v-u-SGW can be configured by operator and user. In addition to as an anchor point, the v-s-SGW can be used as convergence point of different access link specifications, UE network access key material holder, fountain codec, etc. Besides the v-u-SGW, a virtual UE specific connectivity manager (v-u-CM) is also defined. As elaborated in the following section, the v-u-CM performs the customized UE location tracking and triggers the re-placement of the v-u-SGW, which can be viewed as virtual network migration.

Example Use Case #3: Customized Connectivity Management Architecture

This use case illustrates a self-defined management service. The purpose of mobile connectivity management is to ensure the availability of a mobile device's location at any time in order to efficiently deliver data to the mobile device.

Due to the diversity of wireless network deployment, the diversity of mobile moving environment (highway or local), the diversity of mobile device capability, the diversity of QoE requirement of applications running on a mobile device, mobile customized location tracking is advantageous, and a virtual user connectivity manager (v-u-CM) is introduced. A v-u-CM is a virtual and software defined function and is customized for a specific mobile user or mobile device. The main functions of the v-u-CM include the following aspects: (1) location tracking, i.e., tracking the Relative Location (RL) of a UE, i.e. a mobile device, to the networks and the RL can be represented as a set of network nodes which could potentially service the UE; (2) interaction with the SDRA which manages the resource mapping between the user/mobile's v-u-SGW and the user/mobile; (3) interaction with other connectivity control entities within the hierarchy of connectivity management architecture. The physical location of a v-u-CM in the network may depend on numerous factors, such as the network topology, the mobile device's velocity, the mobile device's operation modes, and the QoE delivered to the user.

Figure 18:
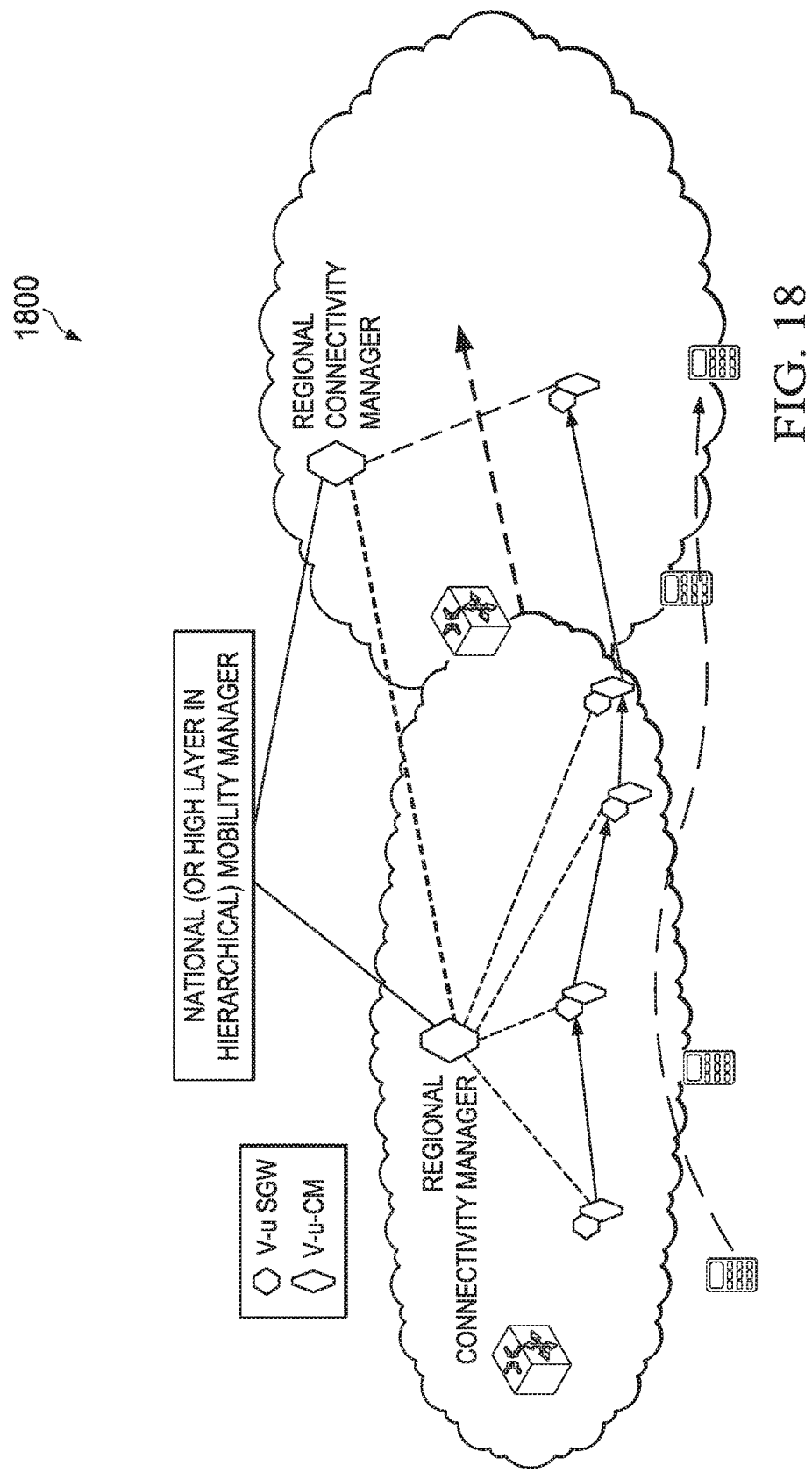
FIG. 18 schematically depicts an embodiment of the variable architecture of connectivity management.

FIG. 18 schematically depicts an embodiment of the variable architecture 1800 of connectivity management. In the hierarchy of connectivity management as shown by way of example in FIG. 18, a v-u-CM is at the lowest level of this hierarchy. Since the v-u-CM is moving along with the mobile device, the architecture of customized mobile connectivity management is not a fixed architecture any more, but a variable one. The connectivity management component may in certain cases make placement decisions for the v-u-CMs of mobile devices.

To summarize, the wireless network utilizes SDN and NFV technologies to provide service customized networks to various different types of services and/or customers. Different types of customers can enjoy the required connectivity and networking services provided by the customized virtual network, and can also actively define, manage and even operate their own virtual networks. This confers significant benefits in wireless networking, including benefits to end-users (customers), over-the-top customers, virtual network operators and wireless network operators. Embodiments of this invention will involve a significant transformation in network architecture, operation and management. This can be implemented using automatic creation of service customized virtual networks, i.e. SONAC.

Among SONAC techniques, the SDT technique needs to determine the end-to-end service customized logical topology such that the service required data transmission and handling can be efficiently satisfied. To make such a decision, SDT needs to take into consideration the device distribution of a service (i.e., M2M service), service traffic characteristics, service QoE requirements, network topology and wireless network resource availability. As SDT creates customized virtual network architectures for individual services that may generally have different requirements and considerations, there are clearly no one-size-fits-all SDT solutions. Different SDT techniques are expected for different services. As there are so many possibilities, initial SDT implementation may require creation of a service classification. A proper service classification will greatly reduce SDT use cases and simplify SDT implementation. For each service class, typical requirements and constraints are identified so that a specially tailored SDT solution can be developed. SDT solutions once applied should not change very often to avoid unnecessary overhead. In this case, they must be robust enough to tolerate short-time network dynamics and service dynamics. SDT problems are complicated optimization problems with multiple objectives and intertwined constraints but these may be solved to satisfy distinct service requirements. Finally, SDT solutions may be seamlessly integrated with other components of the wireless network system and deployed in real-life applications.

The SDRA technique determines physical network resource allocation which needs to ensure the service QoE is met and the wireless network resource is most efficiently utilized. The resource allocation can be different in a radio access network (RAN) compared to a wired network as the capacity of a wireless link in a radio access network is not fixed. Therefore, SDRA in wireless networks, e.g. 5G wireless networks, requires either reasonably accurate radio link abstraction or some interaction with a radio access link scheduler. A good SDRA algorithm should be able to capture the dynamics in radio access link and at the same time to make the implementation simple.

The SDP technique is used to configure the best suitable end-to-end data transport protocols. This involves the definition of basic data process unit set and determination of the subset of process units which is customized for a particular service. A good SDP strategy is to make the wireless network flexible to enable service customized data process while keeping the network operation simple.

Figure 19:
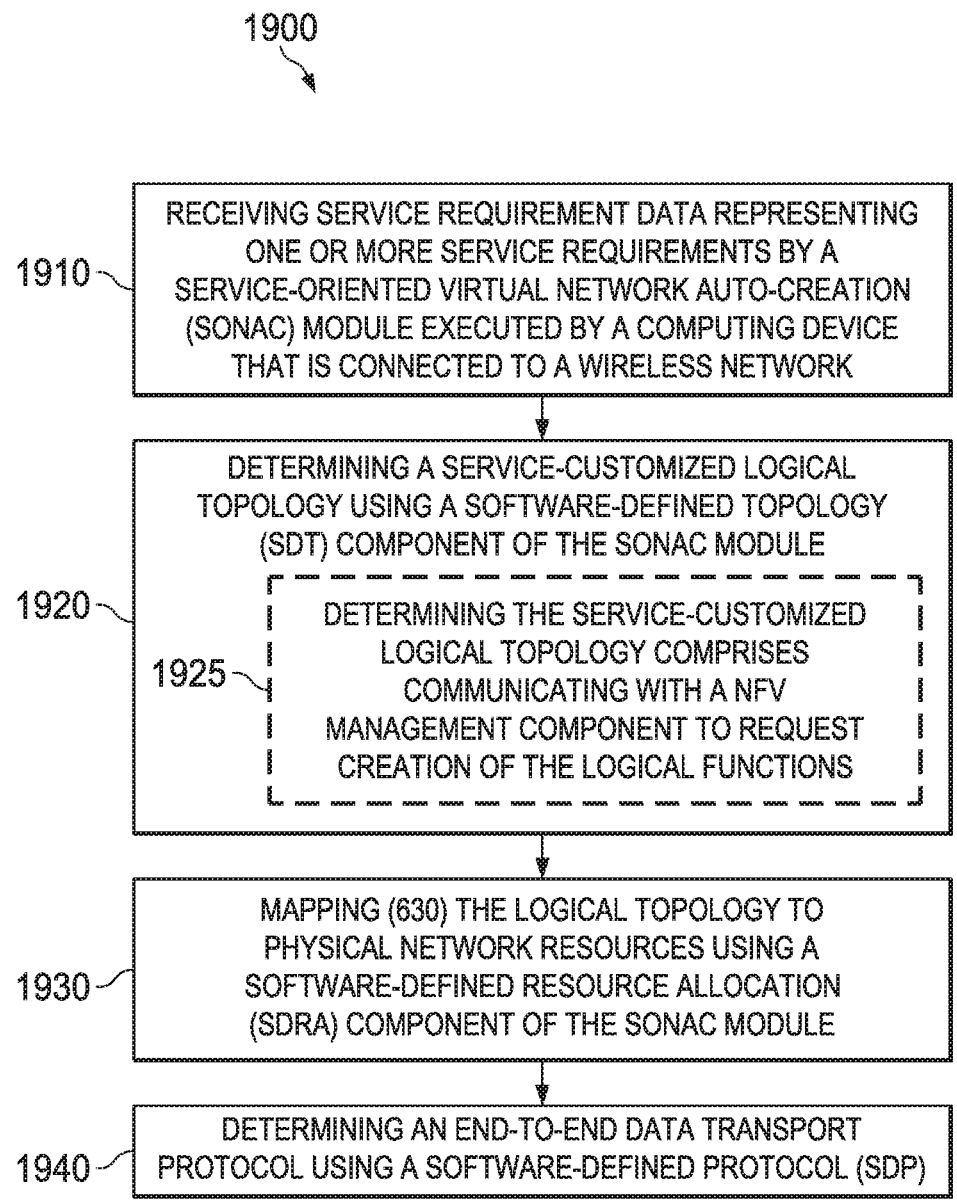
FIG. 19 is a flowchart outlining an embodiment of a method of providing customized. virtual wireless networks.

FIG. 19 presents a flowchart depicting an embodiment of a method 1900 of providing a customized virtual wireless network. The method entails receiving (1910) service requirement data representing one or more service requirements by a service-oriented virtual network auto-creation (SONAC) module executed by a computing device that is connected to a wireless network, determining (1920) a service-customized logical topology using a software-defined topology (SDT) component of the SONAC module, mapping (1930) the logical topology to physical network resources using a software-defined resource allocation (SDRA) component of the SONAC module, and determining (1940) an end-to-end data transport protocol using a software-defined protocol (SDP). In one implementation, the method further includes determining (1925) the service-customized logical topology comprises communicating with a NFV management component to request creation of the logical functions. The NFV management component may be part of NFV management architecture that is either centralized or distributed. In one implementation, a single data center (DC) can be abstracted as one NFV-capable network node. One VFV-capable network node can have a local NFV manager.

Figure 20:
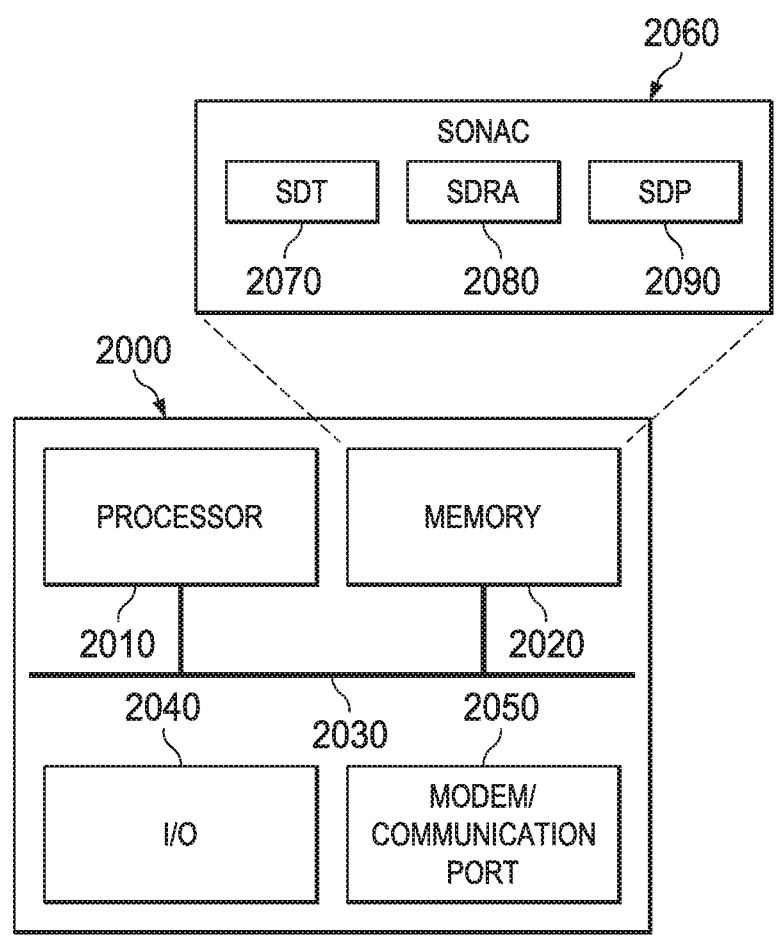
FIG. 20 is a schematic depiction of an embodiment of a computing device that executes the SONAC module in order to provide customized virtual wireless networks.

FIG. 20 schematically depicts an embodiment of a computing device 2000 that includes a processor 2010 operatively coupled to a memory 2020 via a data bus 2030. The computing device also includes input/output (I/O) devices 2040 (e.g. keyboard, mouse, display screen, etc.) and a modem (or communication port, network adapter, transceiver, etc.) 2050. The memory 2020 stores the SONAC module 2060 which includes the SDT component 2070, the SDRA component 2080 and the SDP component 2090. Each of the components 2070, 2080, 2090 includes software code that may be executed by the processor 2010 to provide the functions described above. The service requirement data may be received by the modem 140 or entered directly using the I/O device(s) 2040. The computing device 2000 executing the SONAC module 2060 may be disposed at the local area network control center or at the global controller which are shown by way of example in FIG. 1. Alternatively, the SONAC module may be disposed at another node in the control plane. The components 2070, 2080, 2090 of the SONAC module may be stored on and executed by a single computing device or they may be stored on and executed by separate computing devices.

FIGS. 21-27 illustrate systems and methods for an Interface Reference Model. As discussed above, the control plane includes a software defined topology (SDT) logical entity configured to establish a virtual data-plane logical topology for a service, a software defined resource allocation (SDRA) logical entity configured to map the virtual data-plane topology to a physical data-plane for transporting service-related traffic over the wireless network, and a software defined per-service customized data plane process (SDP) logical entity configured to select transport protocol(s) for transporting the service-related traffic over a physical data-plane of the wireless network.

The management plane may include entities for performing various management related tasks. For example, the management plane may include an infrastructure management entity adapted to manage spectrum sharing between different radio access networks (RANs) and/or different wireless networks, e.g., wireless networks maintained by different operators. The management plane may also include one or more of a data and analytics entity, a customer service management entity, a connectivity management entity, and a content service management entity.

A virtual service specific serving gateway (v-s-SGW) is assigned specifically to a service being provided by a group of wirelessly enabled devices, and is responsible for aggregating service-related traffic communicated by the group of wirelessly enabled devices.

An embodiment software defined network application control (SONAC) layer is a control plane function that provisions software controlled virtual networks (SCVNs). Management plane functions are defined that enable the operation of wireless networks (WNs) and provide information required by SONAC. SONAC interfaces with customer services, management function services, and operator services via an application programming interface (API) for virtual network initialization.

An embodiment SONAC interfaces with a GWNI via a control plane-infrastructure plane (C-I) interface to implement virtual networks (VNs) within GWNI. Management function services themselves require virtual network resources, and the logical topology of these VNs is hierarchical and can by automatically updated via a control plane-management plane (C-M) interface. The communications within a management service VN and among management service VNs are through a management plane-management plane (M-M) interface.

The customer service VN can be automatically updated by, e.g., a virtual service specific serving gateway (v-s-SGW) in the user plane via a control plane-user plane (C-U) interface. For the hierarchical logical topology of SONAC, the information is exchanged among layers of the hierarchy and among these three components of SONAC via a control plane-control plane (C-C) interface.

A hardware and software manager (HSM) is associated with a single network functions (NFV)-enabled network element (NE) and located within the NFV-enabled NE.

The HSM local control layer within an MN-enabled network node (NN) includes virtual infrastructure manager (VIM), virtual network function manager (VNFM), data process manager (DPM) and data forwarding manager (DFM). VIM and VNFM control the local cloud resources for instantiating the required virtualized network functions (VNFs) as instructed by software defined topology (SDT) and software defined process (SDP). DPM controls the processing of data based on a process chain definition by instruction by SDP. DFM controls the data forwarding based on the forwarding rule by software defined resource allocation (SDRA).

For the interaction between SONAC and NFV-enabled NN, SONAC determines the VNFs to be created (non-transport functions by SDT and transport functions by SDP), the data process chain within NN for one service by SDP, and the forwarding rule for VN's data by SDRA. For the interaction between SONAC and a datacenter (DC) cloud, the operation steps are similar as that for a NFV-enabled NN. The primary difference is that SDN within a DC may be used for interconnections among servers.

Figure 21:
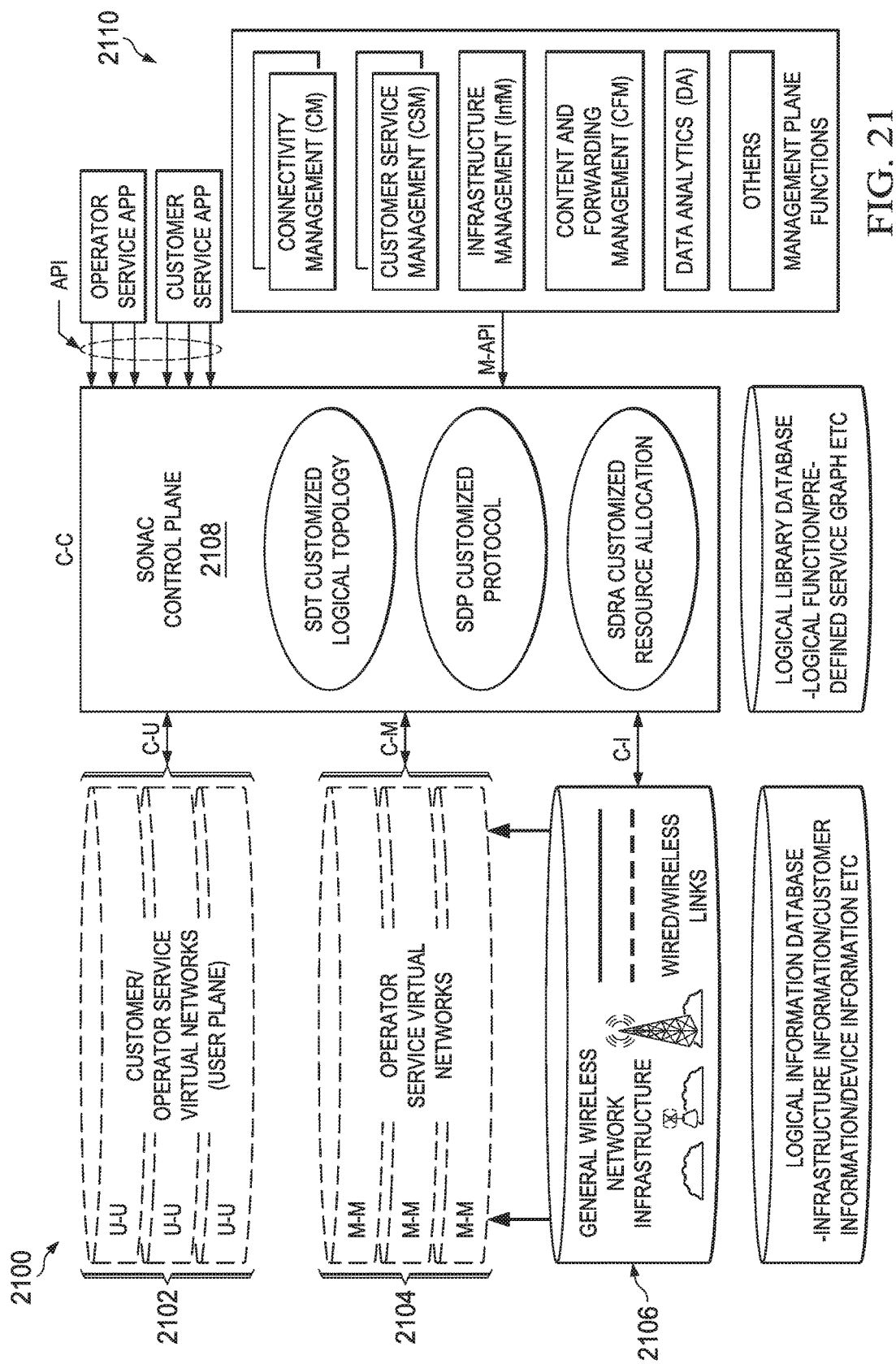
FIG. 21 illustrates a logical interface reference model.

FIG. 21 illustrates an embodiment of a logical interface reference model 2100. The logical interface reference model 2100 includes a customer/operator service Virtual networks 2102, operator service virtual networks 2104 and general wireless network infrastructure 2106 connected to a SONAC 2108 via various interfaces. The logical interface reference model 2100 also includes management plane services 2110 connected to the SONAC 2108 by various APIs. A logical interface reference model 2100 provides the following;
  interface API enables VN initialization;
  interfaces C-I, C-M, C-U enable full automation (on-demand VN update);
  interface M-M enables operation of network operation services management plane); and
  interface user plane-user plane (U-U) enables customer data transmission.

Figure 22:
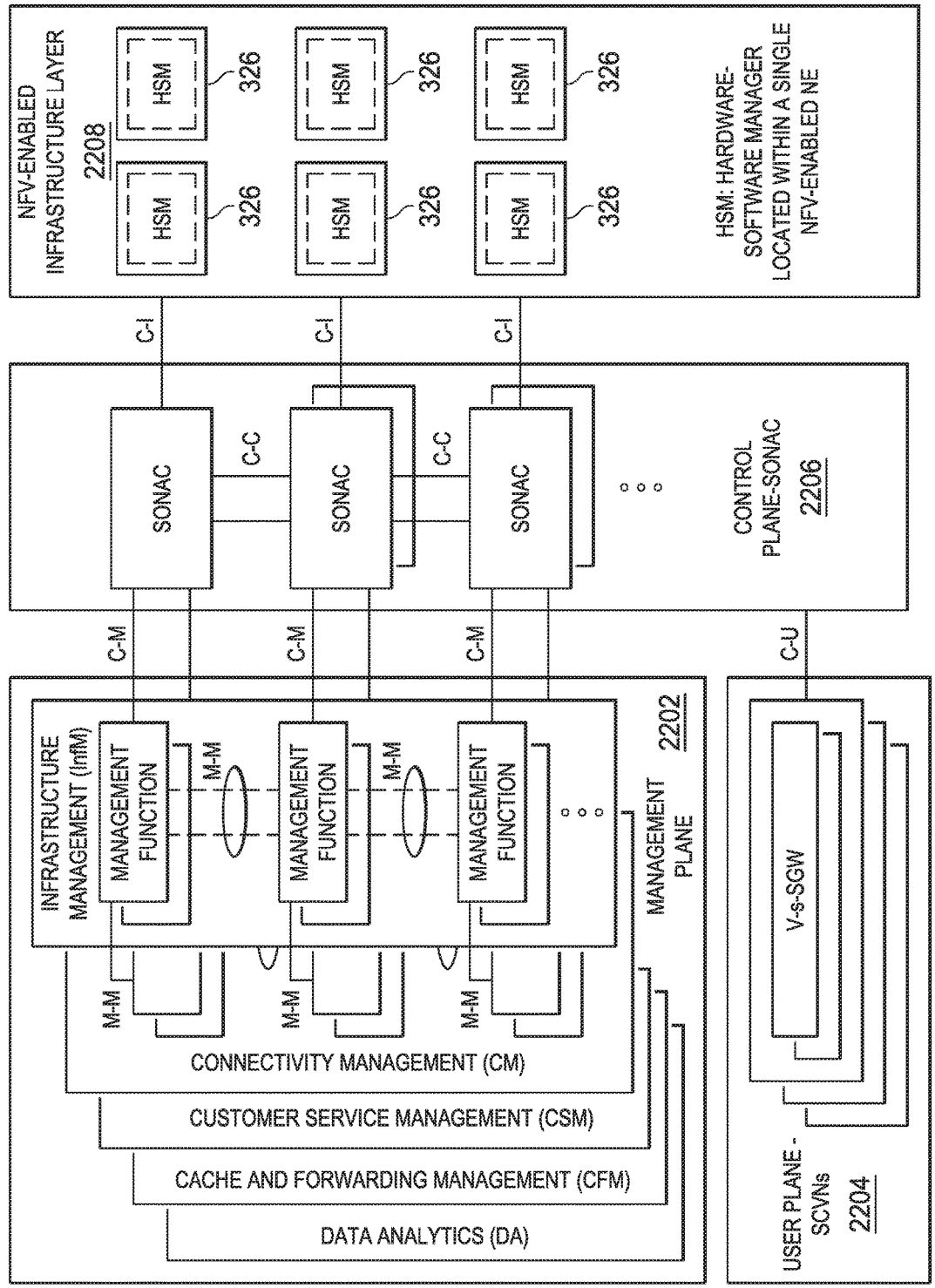
FIG. 22 illustrates a hierarchical SONAC and management architecture.

FIG. 22 illustrates an embodiment of a hierarchical SONAC and management architecture 2200. The architecture 2200 includes a management plane 2202, a user plane 2204, a control plane—SONAC layer 2206, and an NFV-enabled Infrastructure layer 2208.

Figure 23:
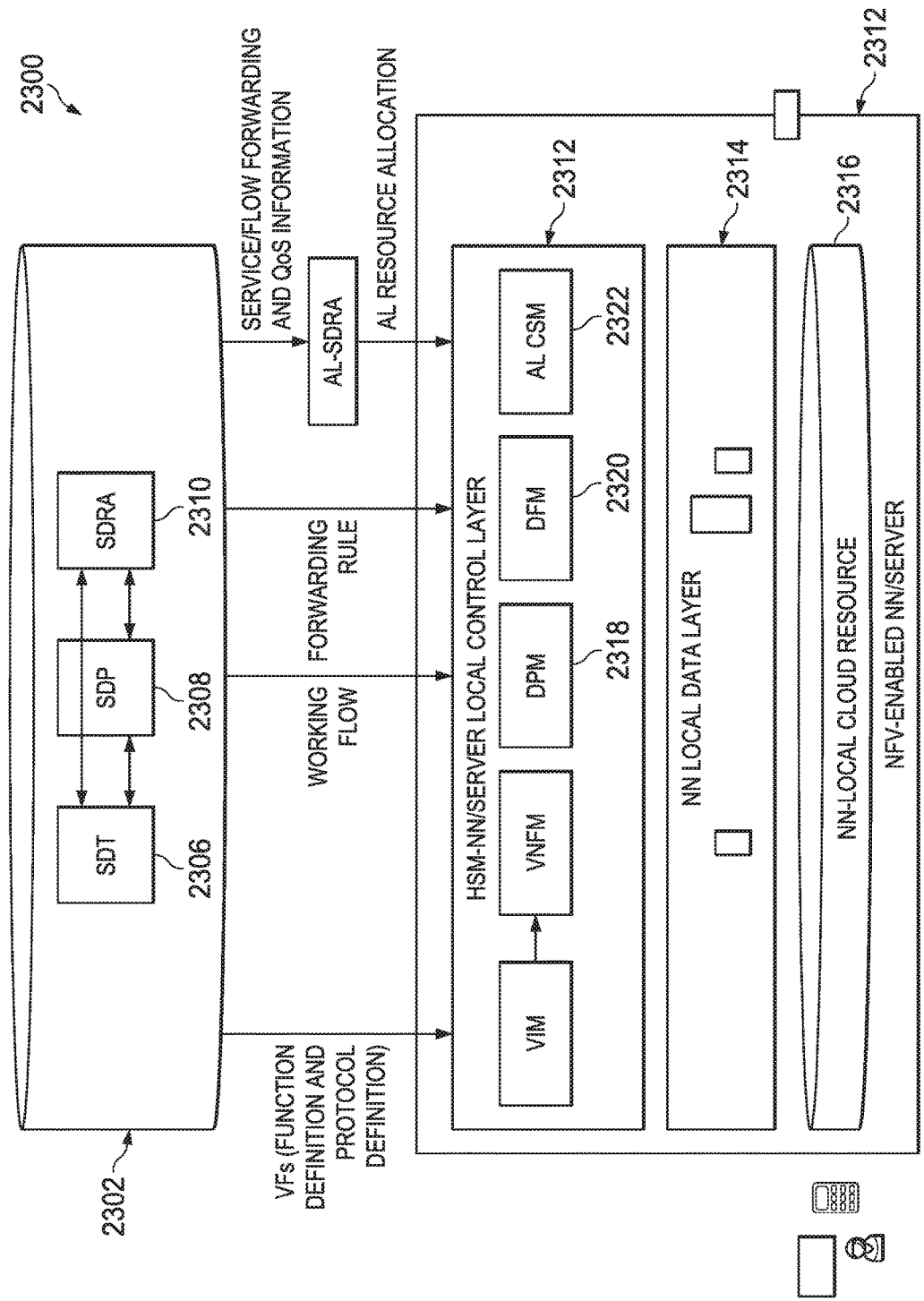
FIG. 23 illustrates SONAC and cloud in a network node/server.

FIG. 23 illustrates an embodiment system 2300 of a SONAC arid cloud in a network node/server. For a SONAC 2302 and NFV-enabled NN 2304, the cloud resource is created and configured by SONAC. This involves determining what NFV needs to be created (e.g., SDT 2306 for non-transport function, SDP 2308 for transport functionality etc.), and determining the data process chain within NN 2304 for one service.

Tele-network resources by SDRA 2310 include forwarding resource, access link resources, and backhaul link resources. The forwarding rule is defined for each VN's data. Access link (AL) resource (T/F/C/P/S) allocation to end devices may be based on service flow forwarding and QoE/QoS requirements given by upper tier SDRA's instruction. The backhaul (BH) link resource (T/F/C/P/S) allocation to neighbors may be based on service flow forwarding and QoE/QoS requirements given by upper tier SDRA's instruction.

The NN 2304 includes a HWM-NN/server local control layer 2312, a NN local data layer 2314, and an NN local cloud resource 2316. Local control at NN 2304 includes a data process manager (DPM) 2318, a data forwarding manager (DFM) 2320, and access link control channel manager (AL CSM) 2322. The DPM 2318 receives data and process the data based on process chain of this service. The DFM 2320 receives data and forwarding data based on the forwarding rule by SDRA 2310. The AL customer service management (CSM) is the AL control channel manager 2322.

Figure 24:
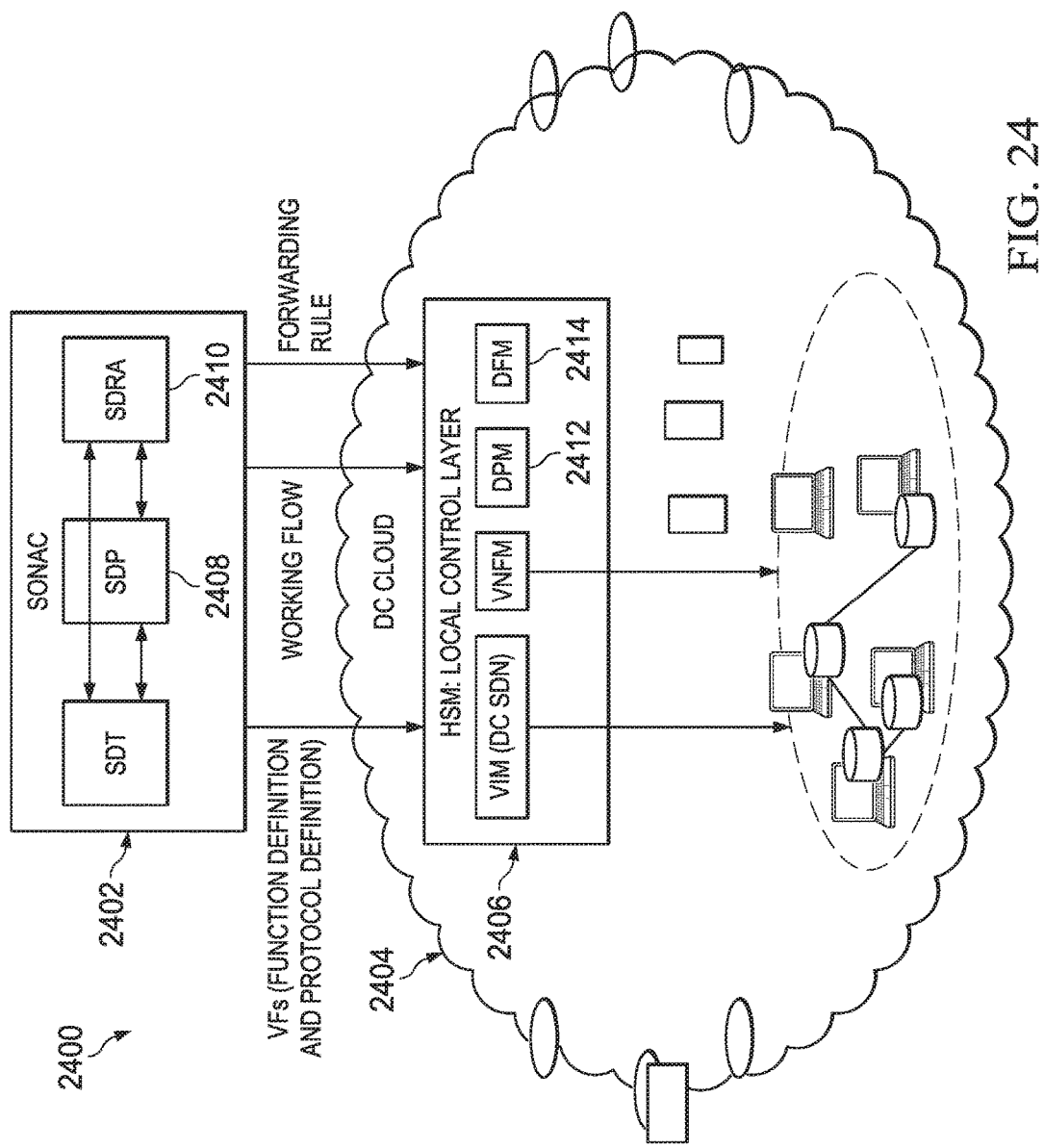
FIG. 24 illustrates a DC abstracted as one NFV-enabled NN.

FIG. 24 illustrates an embodiment of a data center (DC) 2400 abstracted as one NFV-enabled NN. For the SONAC 2402 and NFV-enabled DC 2406, the cloud resource 2404 is created and configured by SONAC 2402. This includes determining what NFV is to be created and a non-transport function chain for one service within the DC cloud 2404 by SDT. This also involves determining the transport protocol functionality by SDP 2408 (for ingress and egress ports only).

Tele-network resources by SDRA 2410 (for ingress and egress ports) may define a forwarding rule for each VN's data (for ingress and egress ports).

Local control at the DC 2406 may include DPM 2412 and DFM 2414. The DPM 2412 receives data and processes the data based on the process chain of this service. The DFM 2414 receives data and forwarding data based on the forwarding rule by SDRA 2410. For edge NN, the DFM 2414 receives data and assigns access link resources based on service flow QoE/QoS requirements by SDRA 2410.

A SONAC 2402 layer is a control plane function dedicated to the provisioning of SCVNs. Management plane functions may be defined to enable the operation of WNs and to provide information (required or otherwise) to the SONAC 2402 layer.

Figure 25:
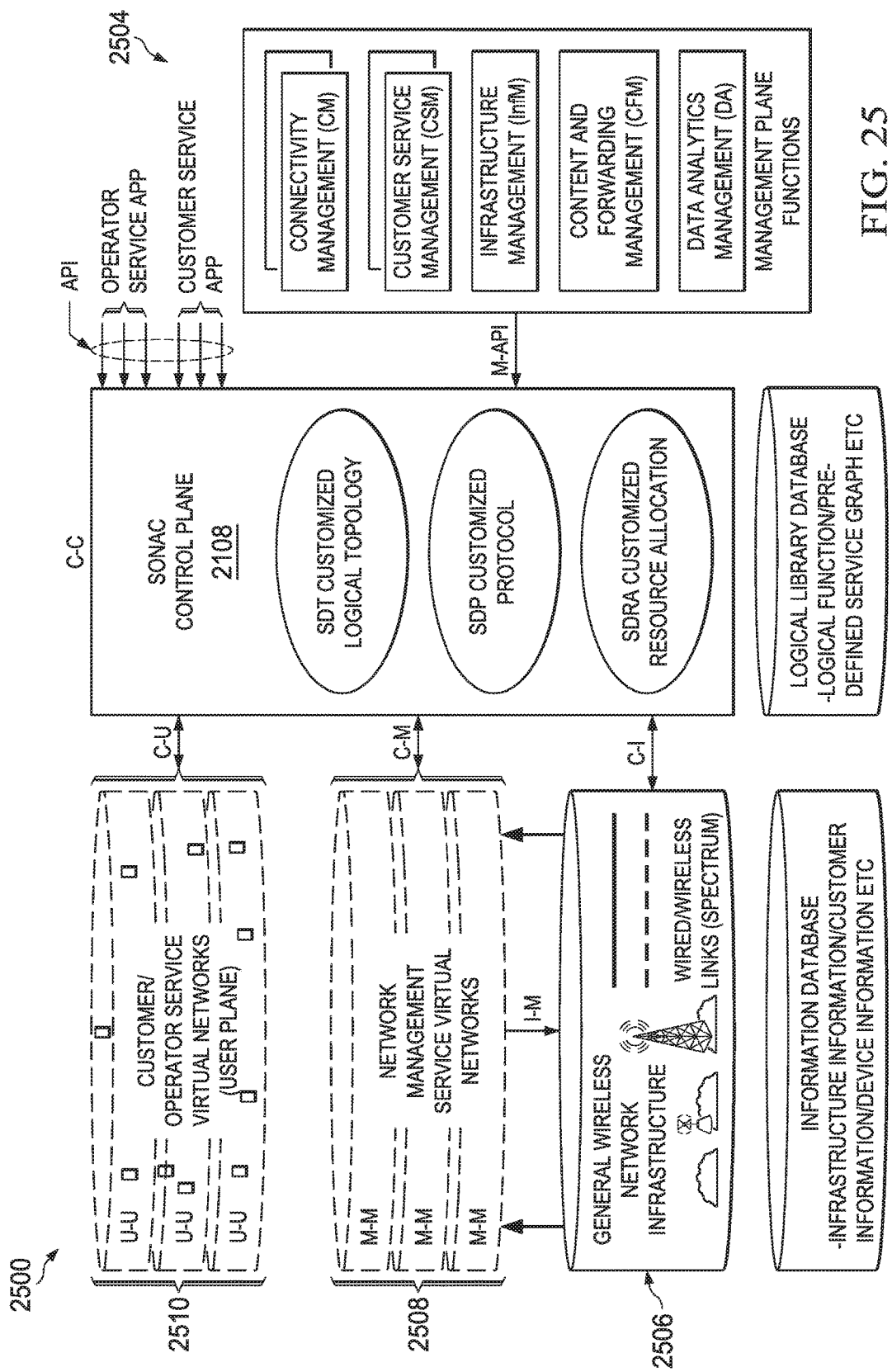
FIG. 25 illustrates a diagram of a logical interface reference module for a next-generation network.

FIG. 25 illustrates a diagram of an embodiment of a logical interface reference module 2500 for a next-generation network. The SONAC 2502 layer may use SONAC 2502 interfaces to communicate with services in the management plane 2504, such as customer services, management function services, and operator services. The SONAC 2502 interfaces may include application programmable interfaces (APIs) adapted for virtual network initialization.

The SONAC 2502 layer may also use SONAC 2502 interfaces to communicate with a GWNI 2506, network management service virtual networks, and customer/operator service virtual networks. For example, the SONAC 2502 layer may use a C-I interface to implement VNs within GWNI 2506. Management function services themselves may require virtual network resource and the logical topology of these VNs are hierarchical and can be automatically updated via the C-M interface. The SONAC 2502 layer may use the C-M interface to communicate with management service VNs 2508. Communications amongst management service VNs may occur through M-M interfaces. The customer service VN 2510 can be automatically updated by, for example, a v-s-SGW in a user plan via a interface.

For the hierarchical logical topology of SONAC 2502, the information is exchanged among layers of the hierarchy and among the components of the SONAC 2502 via a C-C interface. A Hardware and Software Manager (HSM) may be associated with a single NFV-enabled NE located within the NFV-enabled NE.

In an embodiment, a Hardware-Software Manager (HSM) may be a local control layer within an NFV-enabled NN. The HSM may include a VIM and a VNFM for controlling a local cloud resource and for instantiating VNFs as instructed by the SDT and/or the SDP. The HSM may further include a data process manager (DPM) for controlling the processing of data based on a process chain definition. The process chain definition may be communicated via instructions by SDP. The HSM may further include a data forwarding manager (DFM) for controlling data forwarding based on forwarding rules communicated from the SDRA.

During interactions between a SONAC and an NFV-enabled NN, the SONAC may determine what VNFs need to be created (e.g., non-transport functions by an SDT, transport functions by an SDP), a data process chain within a NN for one service by the SDP, and a forwarding rule for VN's data by the SDRA.

For interactions between a SONAC and a DC cloud, the operation steps are similar as that for a NFV-enabled NN. One difference is that the SDN within the DC cloud may be used for interconnections among servers.

As shown in FIG. 25, an I-M interface may allow management plane functions to communicate with the GWNI 2506. The I-M interface may carry infrastructure configuration messages/instructions, and infrastructure behavior log messages.

Figure 26:
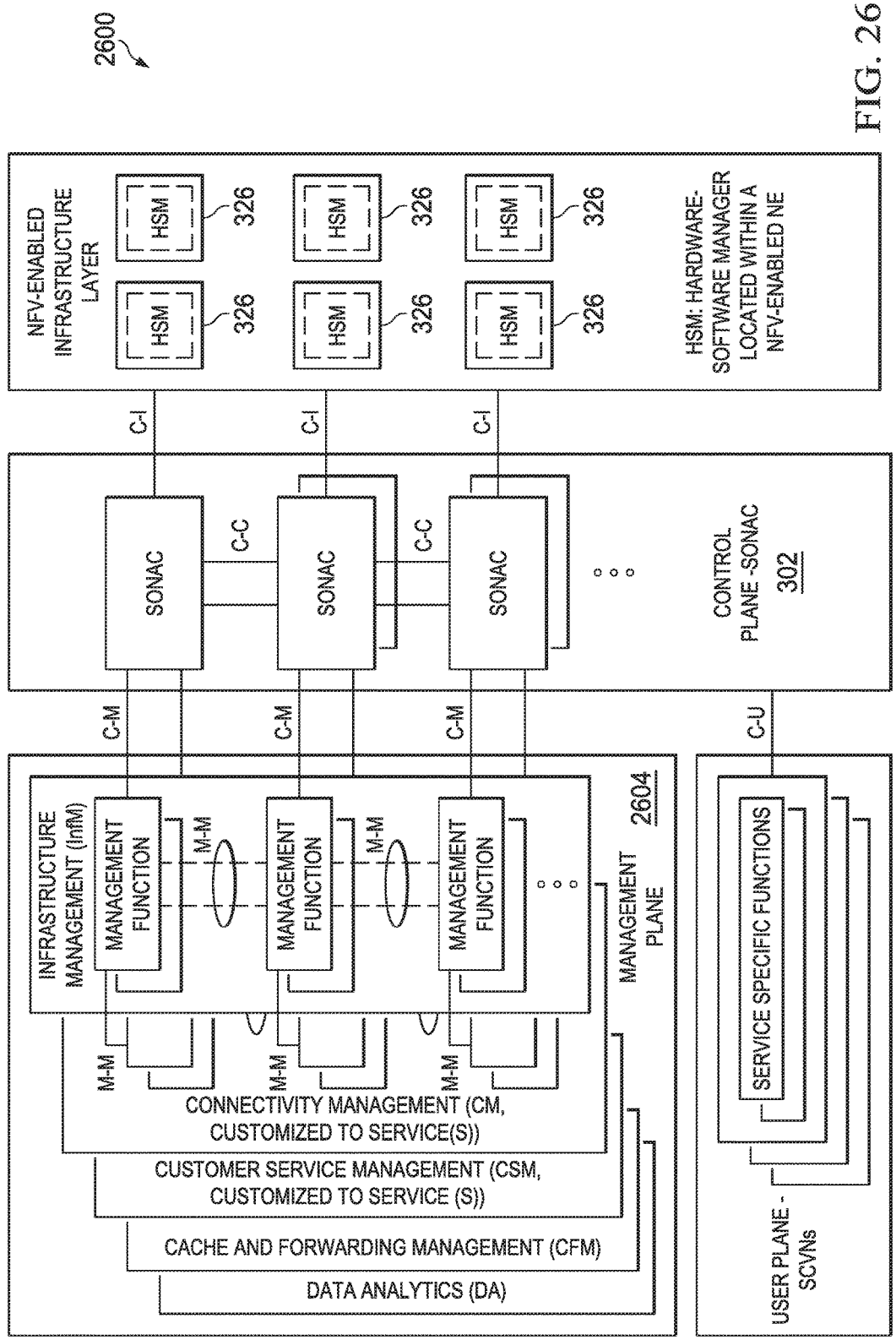
FIG. 26 illustrates another hierarchical SONAC and management architecture.

FIG. 26 illustrates another embodiment of a hierarchical SONAC and management architecture 2600. As shown, the hierarchical SONAC and management architecture 2600 includes a M-API interface between a software defined network application control (SONAC) control plane 2602 and a management plane 2604. The management plane 2604 includes various management plane entities, including a Customer Service management (CSM) entity and a customized Connectivity Management (CM) entity. The CSM entity and CM entity may be customized to services. Management plane functions are adapted to communicate specific requirements via the M-API interface to the SONAC control plane 2602. Some of the requirements may include a requirement description, a latency requirement, a capacity requirement, and one or more required logical functions.

Figure 27:
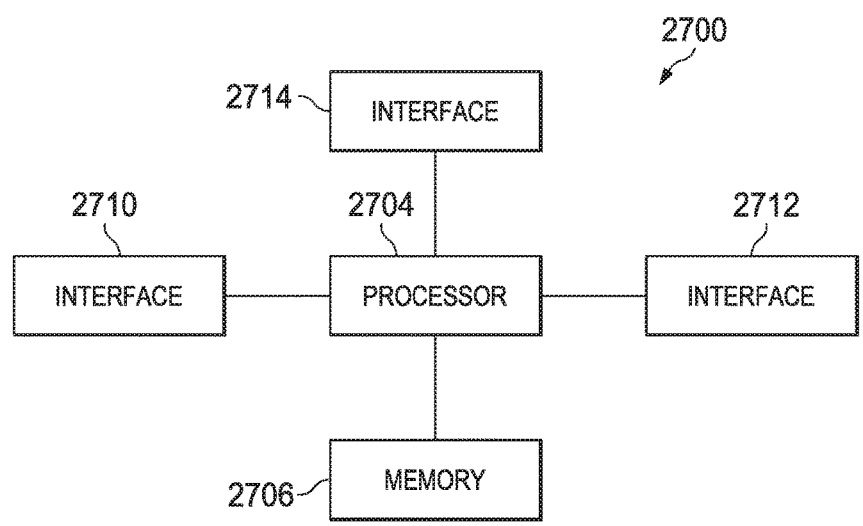
FIG. 27 illustrates a block diagram of an embodiment processing system for performing methods described herein, which may be installed in a host device.

FIG. 27 illustrates a block diagram of an embodiment processing system 2700 for performing methods described herein, which may be installed in a host device. As shown, the processing system 2700 includes a processor 2704, a memory 2706, and interfaces 2710-2714, which may (or may not) be arranged as shown in FIG. 27. The processor 2704 may be any component or collection of components adapted to perform computations and/or other processing related tasks, and the memory 2706 may be any component or collection of components adapted to store programming and/or instructions for execution by the processor 2704. In an embodiment, the memory 2706 includes a non-transitory computer readable medium. The interfaces 2710, 2712, 2714 may be any component or collection of components that allow the processing system 2700 to communicate with other devices/components and/or a user. For example, one or more of the interfaces 2710, 2712, 2714 may be adapted to communicate data, control, or management messages from the processor 2704 to applications installed on the host device and/or a remote device. As another example, one or more of the interfaces 2710, 2712, 2714 may be adapted to allow a user or user device (e.g., personal computer (PC), etc.) to interact/communicate with the processing system 2700. The processing system 2700 may include additional components not depicted in FIG. 27, such as long term storage (e.g., non-volatile memory, etc.).

In some embodiments, the processing system 2700 is included in a network device that is accessing, or part otherwise of, a telecommunications network. In one example, the processing system 2700 is in a network-side device in a wireless or wireline telecommunications network, such as a base station, a relay station, a scheduler, a controller, a gateway, a router, an applications server, or any other device in the telecommunications network. In other embodiments, the processing system 2700 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

In some embodiments, one or more of the interfaces 2710, 2712, 2714 connects the processing system 2700 to a transceiver adapted to transmit and receive signaling over the telecommunications network.

Figure 28:
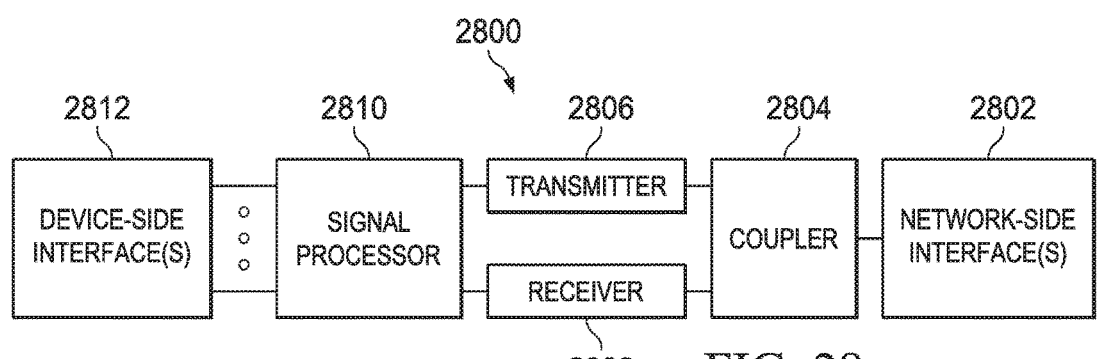
FIG. 28 illustrates a block diagram of a transceiver adapted to transmit and receive signaling over a telecommunications network.

FIG. 28 illustrates a block diagram of a transceiver 2800 adapted to transmit and receive signaling over a telecommunications network. The transceiver 2800 may be installed in a host device. As shown, the transceiver 2800 comprises a network-side interface 2802, a coupler 2804, a transmitter 2806, a receiver 2808, a signal processor 2810, and a device-side interface 2812. The network-side interface 2802 may include any component or collection of components adapted to transmit or receive signaling over a wireless or wireline telecommunications network. The coupler 2804 may include any component or collection of components adapted to facilitate bi-directional communication over the network-side interface 2802. The transmitter 2806 may include any component or collection of components (e.g., up-converter, power amplifier, etc.) adapted to convert a baseband signal into a modulated carrier signal suitable for transmission over the network-side interface 2802. The receiver 2808 may include any component or collection of components (e.g., down-converter, low noise amplifier, etc.) adapted to convert a carrier signal received over the network-side interface 2802 into a baseband signal. The signal processor 2810 may include any component or collection of components adapted to convert a baseband signal into a data signal suitable for communication over the device-side interface(s) 2812, or vice-versa. The device-side interfaces) 2812 may include any component or collection of components adapted to communicate data-signals between the signal processor 2810 and components within the host device (e.g., the processing system 2700, local area network (LAN) ports, etc.).

The transceiver 2800 tray transmit and receive signaling over any type of communications medium. In some embodiments, the transceiver 2800 transmits and receives signaling over a wireless medium. For example, the transceiver 2800 may be a wireless transceiver adapted to communicate in accordance with a wireless telecommunications protocol, such as a cellular protocol (e.g., long-term evolution (LTL), etc.), a wireless local area network (WLAN) protocol (e.g., Wi-Fi, etc.), or any other type of wireless protocol (e.g., Bluetooth, near field communication (NFC), etc.). In such embodiments, the network-side interface 2802 comprises one or more antenna/radiating elements. For example, the network-side interface 2802 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 2800 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device. In various embodiments, the SONAC architecture may hierarchical or may be self-defined and can be viewed as a control slice. In an embodiment, a SONAC interfaces with service(s) and/or application(s) via an API to initiate or update SCVN based on the customer requirement. Embodiments of the disclosed methods and systems include a user plane-user plane (U-U) interface between functions within user plane for user plane traffic forwarding. Embodiments of the disclosed methods and systems include a M-M interface between management service slices. Examples includes CM-CSM, CSM-InfM, InfM-DAM, CSM-DAM, etc. for inter-management slice communication. Embodiments of the disclosed methods and systems also include the interfaces within a management plane, such as, CM-MM, CSM-MM, InfM-MM, DAM-MM, CFM-MM, for intra management service slice communication The C-C interface provides an interface among functions within a SONAC slice. The C-I interface provides an interface among functions within a SOANC slice. The C-I: interface provides a mechanism for a SONAC to configure infrastructure. The C-M interface provides an interface between the SONAC and a management plane service for communication between management services and SONAC. The C-U interface provides an interface between the SONAC and the user plane for on-demand SCVN/slice update(s).

A network management entity for providing a customized virtual wireless network includes a service-oriented virtual network auto-creation (SONAC) module executed by a computing device that is connected to a wireless network, the SONAC module configured to receive service requirement data from the wireless network and create a service customized virtual network (VN) according to the service requirement data, the service requirement data describing one or more service requirements; wherein the SONAC module comprises an interface to interact with: a software-defined topology (SDT) component, the SDT component used by the SONAC module to determine a service customized logical topology; a software-defined resource allocation (SDRA) component that maps the logical topology to physical network resources within the wireless network; and a software-defined protocol (SDP) component that determines an end-to-end data transport protocol for communication between a first device and a second device via the wireless network. In an embodiment, the network management entity includes the SDT, the SDRA, and the SDP components. In an embodiment, the SONAC module is configured to interface with at least one of a service and an application via an application programming interface (API) to initiate or update a service-customized virtual network (SCVN) according to a customer requirement. In an embodiment, the SONAC module is configured to automatically update the service customized VN via a control plane-user plane (C-U) interface. In an embodiment, the service customized VN is updated via a virtual service specific serving gateway (v-s-SGW) in a user plane via the C-U interface. In an embodiment, the SONAC module is coupled to a management plane via a management plane application programming interface (M-API), wherein the SONAC module defines a management plane service topology. In an embodiment, the management plane performs at least one of connectivity management, customer service management, infrastructure management, content and forwarding management, and data analysis management. In an embodiment, the network management entity also includes a user plane-user plane (U-U) interface that provides an interface between functions within user plane for user plane traffic forwarding. In an embodiment, the network management entity also includes a management plane-management plane (M-M) interface that provides an interface between management service slices for inter-management slice communication. In an embodiment, the network management entity also includes a control plane-control plane (C-C) interface that provides an interface among functions within a SONAC slice. In an embodiment, the network management entity also includes a control plane-infrastructure plane (C-I) interface that provides an interface for the SONAC module to configure infrastructure. In an embodiment, the network management entity also includes a control plane-management plane (C-M) interface that provides an interface between the SONAC module and a management plane service for communication between management services and the SONAC module. In an embodiment, the network management entity also includes a control plane-user plane (C-Ur) interface between the SONAC module and a user plane for on-demand service-customized virtual network (SCVN)/slice update. In an embodiment, the SONAC module is configured to associate a virtual user equipment (UE) specific serving gateway (SGW) in response to service requirement data for a registered UE. In an embodiment, the SONAC module is configured to create a virtual user connectivity manager for a user equipment (UE) in response to service requirement data for the UE. In an embodiment, the SONAC module is configured to receive a trigger for a VN update via a control plane-user plane (C-U) interface with a user plane. In an embodiment, the SONAC module is configured to couple to a management plane via an M-API interface. In an embodiment, management plane functions on the management plane are configured to communicate requirements via the M-API interface to the SONAC module, wherein the requirements comprise at least one of a requirement description, a latency requirement, a capacity requirement, and a logical function. In an embodiment, the management plane functions comprise at least one of connectivity management, customer service management, infrastructure management, content and forwarding management, and data analysis management. In an embodiment, the SONAC module is configured to interface with a generalized wireless network infrastructure (GWNI) via a control plane-infrastructure plane (C-I) interface to implement the VN within the GWNI. In an embodiment, the SONAC module is configured to interface with operator services and customer services via an application programming interface (API).

An embodiment method in a network device for providing a customized virtual wireless network includes receiving, by a service-oriented virtual network auto-creation (SONAC) module executed by a computing device that is connected to a wireless network, service requirement data representing one or more service requirements; and creating a service customized virtual network (VN) according to the service requirement data, wherein creating the service customized VN comprises determining a service-customized logical topology, mapping the determined logical topology to physical network resources, and determining an end-to-end data transport protocol for use by entities in the logical topology in accordance with the availability of the physical network resources. In an embodiment, determining the service-customized logical topology includes communicating with a network functions virtualization (NFV)-enabled network node (NN) management component to request creation of the logical functions. In an embodiment, the method also includes instantiating or terminating a virtual and service-specific serving gateway (SGW) in response to receiving service requirement data for a machine-to-machine (M2M) service. In an embodiment, the method also includes associating a virtual user equipment (UE) specific serving gateway (SGW) in response to receiving service requirement data for a registered UE. In an embodiment, the method also includes creating a virtual user connectivity manager for a user equipment (UE) in response to receiving service requirement data for the UE.

An embodiment network node includes a processor; and a non-transitory computer readable storage medium storing programming for execution by the processor, the programming including instructions to: receive, a service-oriented virtual network auto-creation (SONAC) module, service requirement data representing one or more service requirements; and create a service customized virtual network (VN) according to the service requirement data, wherein the instructions to create the service customized VN comprises instructions to: determine a service-customized logical topology, map the determined logical topology to physical network resources, and determine an end-to-end data transport protocol for use by entities in the logical topology in accordance with the availability of the physical network resources. In an embodiment, the instructions to determine the service-customized logical topology include instructions to communicate with a network functions virtualization (NFV)-enabled network node (NN) management component to request creation of the logical functions. In an embodiment, the programming further includes instructions to instantiate or to terminate a virtual and service-specific serving gateway (SGW) in response to receiving service requirement data for a machine-to-machine (M2M) service. In an embodiment, the programming further includes instructions to associate a virtual user equipment (UE) specific serving gateway (SGW) in response to receiving service requirement data for a registered UE. In an embodiment, the programming further includes instructions to create a virtual user connectivity manager for a user equipment (UE) in response to receiving service requirement data for the UE.

The following references are related to subject matter of the present application. Each of these references is incorporated herein by reference in its entirety:

[1] Original NFV White Paper, October 2012: http://portal.etsi.org/NFV/NFV_White_Paper.pdf.
[2] NFV White Paper #2, Oct. 15-17, 2013: http://portal.etsi.org/NFV/NFV_White_Paper2.pdf.
[3] NFV White Paper #3 Oct. 14-17, 2014: http://portal.etsi.org/NFV/NVF_White_Paper3.pdf.
[4] B. Han et al., "Network Function Virtualization: Challenges and Opportunities for Innovations," IEEE Commun. Mag., vol. 53, no. 2, February 2015, pp. 90-97.
[5] R. Jain and S. Paul, "Network Virtualization and Software Defined Networking for Cloud Computing: A Survey," IEEE Commun. Mag., vol. 51, November 2013, pp. 24-31.
[6] F. Callegati et al., "Performance of Multi-Tenant Virtual Networks in Openstack-Based Cloud Infrastructures," IEEE GLOBECOM Wksps., 8-12 December 2014, pp. 81-85.
[7] J. Soares et al., "Toward a Telco Cloud Environment for Service Functions," IEEE Commun. Mag., vol. 53, no. 2, February 2015, pp. 98-106.
[8] Final Report on Architecture, ICT-317669-METIS/D6.4, METIS, January 2015.
[9] ONF White Paper, Software-Defined Networking: The New Norm for Networks, Apr. 13, 2012: https://www.opennetworking.org/images/stories/downloads/sdn-resources/white-papers/wp-sdn-newnorm.pdf.
[10] OpenFlow White Paper: Enabling Innovation in Campus Networks, Mar. 14, 2008: http://archive.openflow.org/documents/openflow-wplatest.pdf.
[11] Open Flow-enabled SDN and Network Functions Virtualization, Feb. 17, 2014: https://www.opennetworking.org/images/stories/downloads/sdnresources/solution-briefs/sb-sdn-nvf-solution.pdf.
[12] NGMN 5G White Paper Executive Version, v. 1.0, Dec. 22, 2014: http://www.ngmn.org/uploads/media/.141222_NGMNExecutive_Version_of_the_5G_White_Paper_v1_0_01.pdf
[13] V. Jacobson et al., "Networking Named Content," ACM CoNEXT 2009.
[14] ETSI GS NFV 001 v1.1.1, Network Functions Virtualisation (NFV); Use Cases
[15] ETSI GS NFV 002 v1.1.1, Network Functions Virtualisation (NW); Architectural Framework
[16] ETSI GS NFV 004 v1.1.1, Network Functions Virtualisation (NFV); Virtualisation Requirements
[17] ETSI GS NFV-MAN 001 v0.6.1, Network Function Virtualization (NFV); Management and Orchestration
[18] ETSI Network Function Virtualisation, «http://www.etsi.org/technologies-clusters/technologies/nfv».

[19] H. Hawilo, A. Shami, M. Mirahmadi, and R. Asal, "NFV: State of the Art, Challenges and Implementation in Next Generation Mobile Networks (vEPC), " IEEE Network, 2014. To appear.

[20] Open Networking Foundation, «opennetworking.org».

[21] S. Sezer, S. Scott-Hayward, P.-K. Chouhan, B. Fraser, D. Lake, J. Finnegan, N. Viljoen, M. Miller, and N. Rao, "Are We Ready for SDN? Implementation Challenges for Software-Defined Networks," IEEE Communications Magazine, 51(7): 36-43, 2013.

Kenneth J. Kerpez, et al., "Software-Defined Access Networks", IEEE Communications Magazine, September 2014

[23] A. Osseiran, F. Boccardi, V. Braun, K. Kusume, P. Marsch, M. Maternia, O. Queseth, M. Schellmann, H. Schotten, H. Taoka, H. Tullberg, M.A. Unsitalo, B. Timus, and M. Fallgren, "Scenarios for the 5G Mobile and Wireless Communications: the Vision of the METIS Project," IEEE Communications Magazine, vol. 52, no. 5, pp. 26-35, 2014.

[24] Zhang, U.S. patent application Ser. No. 14/639,572, entitled "System and Method for a Customized Fifth Generation (5G) Network," filed Mar. 5, 2015.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A network management entity for providing a service customized virtual wireless network, the network management entity comprising:
a virtualization module used by the network management entity to:
receive service requirement data, the service requirement data describing one or more service requirements; and
create the service customized virtual wireless network according to the service requirement data; and
an interface used by the network management entity to interact with:
a software-defined topology (SDT) component, the SDT component used by the network management entity to determine a service customized logical topology;
a software-defined resource allocation (SDRA) component that creates mapping of the service customized logical topology to physical network resources within the service customized virtual wireless network; and
a software-defined protocol (SDP) component that determines an end-to-end data transport protocol for communication between a first device and a second device via the service customized virtual wireless network based on the service customized logical topology and the mapping,
wherein the network management entity is coupled to a management plane via a management plane application programming interface (M-API), and wherein the network management entity defines a management plane service topology.

2. The network management entity of claim 1, wherein the network management entity includes the SDT, the SDRA, and the SDP components.

3. The network management entity of claim 1, wherein the network management entity is configured to interface with at least one of a service and an application via an application programming interface (API) to initiate or update the service customized virtual wireless network according to a customer requirement.

4. The network management entity of claim 1, wherein the network management entity is configured to automatically update the service customized virtual wireless network via a control plane-user plane (C-U) interface.

5. The network management entity of claim 4, wherein the service customized virtual wireless network is updated via a virtual service specific serving gateway (v-s-SGW) in a user plane via the C-U interface.

6. The network management entity of claim 1, further comprising a user plane-user plane (U-U) interface used by the network management entity to provide an interface between functions within user plane for user plane traffic forwarding.

7. The network management entity of claim 1, further comprising a management plane-management plane (M-M) interface used by the network management entity to provide an interface between management service slices for inter-management slice communication.

8. The network management entity of claim 1, further comprising a control plane-control plane (C-C) interface used by the network management entity to provide an interface among functions within a slice.

9. The network management entity of claim 1, further comprising a control plane-infrastructure plane (C-I) interface used by the network management entity to provide an interface for the network management entity to configure infrastructure.

10. The network management entity of claim 1, further comprising a control plane-management plane (C-M) interface used by the network management entity to provide an interface between the network management entity and a management plane service for communication between management services and the network management entity.

11. The network management entity of claim 1, wherein the service customized virtual wireless network comprises one or more virtual service specific serving gateways (v-s-SGWs).

12. A method in a network device for providing a service customized virtual wireless network, the method comprising:
receiving, by a module executed by a computing device that is connected to a wireless network, service requirement data, the service requirement data representing one or more service requirements, wherein the module is coupled to a management plane via a management plane application programming interface (M-API), and wherein the module defines a management plane service topology; and
creating the service customized virtual wireless network according to the service requirement data, wherein the creating the service customized virtual wireless network comprises:
determining a service customized logical topology,
creating mapping of the determined service customized logical topology to physical network resources within the service customized virtual wireless network, and determining an end-to-end data transport protocol for communication between a first device and a second device via the service customized virtual wireless network based on the service customized logical topology and the mapping.

13. The method of claim 12, wherein determining the service customized logical topology comprises communicating with a network functions virtualization (NFV)-enabled network node (NN) management component to request creation of logical functions.

14. The method of claim 12, further comprising instantiating or terminating a virtual and service-specific serving gateway (SGW) in response to receiving the service requirement data for a machine-to-machine (M2M) service.

15. The method of claim 12, further comprising associating a virtual user equipment (UE) specific serving gateway (SGW) in response to receiving the service requirement data for a registered UE.

16. The method of claim 12, further comprising creating a virtual user connectivity manager for a user equipment (UE) in response to receiving the service requirement data for the UE.

17. A network node for providing a service customized virtual wireless network, the network node comprising:
an interface providing a connection to a wireless network;
a processor coupled to the interface; and
a non-transitory computer readable storage medium storing programming for execution by the processor, the programming including instructions to:
receive service requirement data, the service requirement data representing one or more service requirements, wherein a module is coupled to a management plane via a management plane application programming interface (M-API), and wherein the module defines a management plane service topology; and
create the service customized virtual wireless network according to the service requirement data, wherein the instructions to create the service customized virtual wireless network comprise instructions to:
determine a service customized logical topology,
creating mapping of the determined service customized logical topology to physical network resources within the service customized virtual wireless network, and
determine an end-to-end data transport protocol for communication between a first device and a second device via the service customized virtual wireless network based on the service customized logical topology and the mapping.

18. The network node of claim 17, wherein the instructions to determine the service customized logical topology comprise instructions to communicate with a network functions virtualization (NFV)-enabled network node (NN) management component to request creation of logical functions.

19. The network node of claim 17, wherein the programming further comprises instructions to instantiate or to terminate a virtual and service-specific serving gateway (SGW) in response to receiving the service requirement data for a machine-to-machine (M2M) service.

20. The network node of claim 17, wherein the programming further comprises instructions to associate a virtual user equipment (UE) specific serving gateway (SGW) in response to receiving the service requirement data for a registered UE.

21. The network node of claim 17, wherein the programming further comprises instructions to create a virtual user connectivity manager for a user equipment (UE) in response to receiving the service requirement data for the UE.

* * * * *